(12) United States Patent
Segal

(10) Patent No.: US 9,807,002 B2
(45) Date of Patent: Oct. 31, 2017

(54) CENTRALIZED ROUTE DETERMINATION IN COMMUNICATION NETWORKS

(71) Applicant: AT&T Intellectual Property I, L.P., Atlanta, GA (US)

(72) Inventor: Moshe Segal, Tinton Falls, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 365 days.

(21) Appl. No.: 14/699,710

(22) Filed: Apr. 29, 2015

(65) Prior Publication Data

US 2016/0323182 A1 Nov. 3, 2016

(51) Int. Cl.
*G06F 15/173* (2006.01)
*H04L 12/771* (2013.01)

(52) U.S. Cl.
CPC .................................. *H04L 45/56* (2013.01)

(58) Field of Classification Search
USPC .................................. 709/238, 240, 242, 244
See application file for complete search history.

(56) References Cited

U.S. PATENT DOCUMENTS

| | | |
|---|---|---|
| 5,583,792 A | 12/1996 | Li et al. |
| 6,134,589 A | 10/2000 | Hultgren |
| 6,594,268 B1 | 7/2003 | Aukia et al. |
| 7,065,573 B2 | 6/2006 | Byrnes |
| 7,263,069 B2 | 8/2007 | Yegenoglu |
| 7,376,121 B2 | 5/2008 | Dunagan et al. |
| 7,388,842 B1 | 6/2008 | Applegate et al. |
| 7,433,315 B2 | 10/2008 | Bhatia et al. |
| 7,487,237 B2 | 2/2009 | Lloyd et al. |
| 7,633,867 B2 | 12/2009 | Kodialam et al. |

(Continued)

FOREIGN PATENT DOCUMENTS

EP 1598996 3/2007

OTHER PUBLICATIONS

Dzida, Mateusz et al, "Path Generation for a Class of Survivable Network Design Problems", Next Generation Internet Networks, IEEE, 2008 (Abstract, 2 pages).

(Continued)

*Primary Examiner* — Liangche A Wang
(74) *Attorney, Agent, or Firm* — Hanley, Flight & Zimmerman, LLC

(57) ABSTRACT

Methods, apparatus and articles of manufacture (e.g., physical storage media) to perform centralized route determination in communication networks (e.g., such as software defined networks) are disclosed. Example methods for route determination disclosed herein include accessing, with a controller of a software defined network, a first set of constraints specifying whether route splitting is permissible for respective ones of a set of flows in the software defined network. Such disclosed example methods also include accessing, with the controller, a second set of constraints specifying respective bandwidth demands for the respective ones of the set of flows in the software defined network. Such disclosed example methods further include determining, with a linear programming model implemented by the controller, a set of routes based on the first and second sets of constraints, wherein the set of routes is to route the set of flows in the software defined network.

16 Claims, 22 Drawing Sheets

(56) References Cited

U.S. PATENT DOCUMENTS

| | | | |
|---|---|---|---|
| 7,827,301 B2 | 11/2010 | Allen | |
| 7,864,751 B2 | 1/2011 | Greenberg | |
| 7,869,359 B2 | 1/2011 | Kohler et al. | |
| 7,925,163 B2 | 4/2011 | Segal | |
| 7,929,515 B2 | 4/2011 | Puthenpura et al. | |
| 8,005,935 B2 | 8/2011 | Pradhan et al. | |
| 8,116,324 B2 | 2/2012 | Chou et al. | |
| 8,127,350 B2* | 2/2012 | Wei | 379/901 |
| 8,194,535 B2 | 6/2012 | Kodialam et al. | |
| 8,312,139 B2 | 11/2012 | Ninan et al. | |
| 8,477,597 B2 | 7/2013 | Zhang et al. | |
| 8,593,958 B2 | 11/2013 | Zhang | |
| 8,644,191 B2 | 2/2014 | Puthenpura et al. | |
| 8,938,240 B2 | 1/2015 | Farhadi | |
| 9,092,223 B1* | 7/2015 | Pani | G06F 1/3209 |
| 2009/0003217 A1 | 1/2009 | Ferra et al. | |
| 2010/0287073 A1* | 11/2010 | Kocis | G06Q 10/047 705/28 |
| 2010/0296403 A1 | 11/2010 | Qiu et al. | |
| 2011/0061008 A1* | 3/2011 | Gupta | G06F 17/30598 715/764 |
| 2012/0002813 A1* | 1/2012 | Wei | H04L 63/0272 380/270 |
| 2013/0007264 A1 | 1/2013 | Effros et al. | |
| 2013/0120591 A1* | 5/2013 | Bednarczyk | H04W 48/18 348/207.1 |
| 2014/0047106 A1 | 2/2014 | Leung et al. | |
| 2014/0169159 A1 | 6/2014 | Liu | |
| 2015/0149653 A1* | 5/2015 | Archer | H04L 65/60 709/231 |

OTHER PUBLICATIONS

Pioro, Michal et al, "An optimization model for communication networks with partial multiple link failures", Ultra Moden Telecommunications and Control Systems and Workshops (ICUMT), 2013 5th International Congress on IEEE, Sep. 2013 (Abstract, 2 pages).

Carey, Malachy and Srinivasan, Ashok, "Solving a class of network models for dynamic flow control", European Journal of Operational Research 75, 1994 (pp. 151-170).

Liu, Hai and Jia, Xiaohua, "Linear Programming Approaches to Optimization Problems of Energy Efficiency in Wireless Ad Hoc Networks", Handbook on Theoretical and Algorithmic Aspects of Sensor, Ad Hoc Wireless, and Peer-to-Peer Networks, 2005 (18 pages).

Somani, Arun and Ding, Jinxu, "Parallel Computing Solution for Capacity Expansion Network Flow Optimization Problems", Journal of Computing, vol. 4, Issue 7, Jul. 2012 (13 pages).

Gupta, B.K., et al., "Optimization of routing algorithm in wireless mesh networks", Nature & Biologically Inspired Computing, IEEE, 2009 (Abstract, 2 pages).

U.S. Appl. No. 11/062,205, filed Feb. 18, 2015 (20 pages).

Mehmet Balman, "Data Transfer Scheduling with Advance Reservation and Provisioning", Aug. 2010 (85 pages).

* cited by examiner

S1

```
600: param NUMNODES ;                      # number of nodes
601: set NN := 1..NUMNODES ;               # set of nodes
602: param NODES {n in NN};                # node ID 603: param NUMLINKS ;                      # number of links
604: param NUMLINKS2 := 2*NUMLINKS;        # number of link directions
605: set L := 1..NUMLINKS;                 # set of links a to z
606: set L2 := 1..NUMLINKS2;               # set of links a to z and z to a 607: param LO {l in L2};                   # links' originating nodes
608: param LD {l in L2};                   # links' destination nodes
609: param DIST {l in L2};                 # distance of link, for 1<=l<=L DIST[l]=DIST[l+L]

610: param CAP {l in L2};                  # available link capacity defined for set L
                                           # for layer L1 model CAP[l]=CAP[L+l]
                                           # and routed demands on a link in both directions
                                           # are additive for layer L3 model, demands
                                           # (tunnel loads) are additive by direction 611: param FC;                             # augmentation fixed cost
612: param VC;                             # augmentation variable cost 613: param NUMR ;                          # number of requests for routes
614: set R := 1..NUMR;                     # set of routes
615: param RO {r in R};                    # set of route originating end point
616: param RD {r in R};                    # set of route destinations end points
617: param BW {r in R};                    # bandwidth requirement for route r
618: param BK {r in R};                    # split r into k subroutes BK[r]=k, normally k=1
619: param BP {r in R};                    # if r has priority 1, BP[r]=1, xf[r] is set to
                                           # value of 1 and all its BW requests gets routed,
                                           # otherwise BP[r]=0, the model attempts to
                                           # accommodate the BW requests and uses fair
                                           # allocation (e.g., 0<=xf[r]<=1) between the
                                           # non-priority requests, if necessary
```

```
620: param MAXHOP {r in R};           # max allowed number of hopes for route r
621: param MAXDIST {r in R};          # max allowed length of route r 622: param NUMGD ;                    # number of pairs of routes that require diversity
623: set GD := 1..NUMGD;              # set of pairs
624: param GDO {gd in GD};            # route GDO[gd] must be diverse from route GDD[r]
625: param GDD {gd in GD};

626: param NUMBID;                    # number of bundle/SRLG ID constraints
627: set BD := 1..NUMBID;             # set of bundle ID constraints
628: param NLBD {b in BD};            # number of links associated with bundle b
629: set BL {a in BD} := 1..NLBD[a];  # set of links bundled by ID a
630: param BLE {b in BD, l in BL[b]}; # their identity
631: param BDR{b in BD};              # bundle flow thru restriction normally = 1
632: param PENB {b in BD} ;           # penalty for bundle violation of diversity
```

```
# flow due to demand r if on link l.
633: var x{l in L2, r in R} >=0;                    # route r consumption of l's BW 634: var xb{l in L2, r in R} >=0 <=BK[r], integer;  # when BK[r]=1, binary value forces one path;
                                                    # otherwise, when '>=0 <=BK[r]' may split the
                                                    # path 635: var xf{r in R} >=0 <=1;                        # fraction of BW request for route r that are
                                                    # satisfied 636: var xfb >=0 <=1;                               # auxiliary variable for fair allocation 637: var y{l in L2} >=0;                            # link diversity violation measure
638: var z1gd {n in NN, gd in GD} >=0 ;             # node diversity violations measures
639: var z2gd {n in NN, gd in GD} >=0;

640: var v{l in L} >=0 ;                            # link capacity augmentation variable
641: var u{b in BD, g in GD} >=0;                   # bundle/SRLG diversity violation measure
```

```
# ------------------------------------------------
set of multi commodity constraints to establish routes possibly with splits 642: subject to node_conserveb1 {n in NN, r in R : n=RD[r]}:
        sum {l in L2, m in NN : n=LO[l] && m=LD[l]} xb[l,r]
      - sum {l in L2, m in NN : n=LD[l] && m=LO[l]} xb[l,r] = -BK[r];

643: subject to node_conserveb2 {n in NN, r in R : n=RO[r]}:
        sum {l in L2, m in NN : n=LO[l] && m=LD[l]} xb[l,r]
      - sum {l in L2, m in NN : n=LD[l] && m=LO[l]} xb[l,r] = BK[r];

644: subject to node_conserveb3 {n in NN, r in R : n <> RO[r] && n <> RD[r]}:
        sum {l in L2, m in NN : n=LO[l] && m=LD[l]} xb[l,r]
      - sum {l in L2, m in NN : n=LD[l] && m=LO[l]} xb[l,r] = 0 ;

# ------------------------------------------------
# set of multicommodity constraints to route BW requests for priority and
non priority demands 645: subject to node_conserve1 {n in NN, r in R : n=RD[r]}:
        sum {l in L2, m in NN : n=LO[l] && m=LD[l]} x[l,r]
      - sum {l in L2, m in NN : n=LD[l] && m=LO[l]} x[l,r] = -BW[r]*xf[r];

646: subject to node_conserve2 {n in NN, r in R : n=RO[r]}:
        sum {l in L2, m in NN : n=LO[l] && m=LD[l]} x[l,r]
      - sum {l in L2, m in NN : n=LD[l] && m=LO[l]} x[l,r] = BW[r]*xf[r];

647: subject to priority_allocation {r in R: BP[r]=1}:
        xf[r]=1;

# <= equalizes BW.  = equalizes %
648: subject to fair_allocation {r in R: BP[r]=0}:
        xf[r] <= xfb;

649: subject to node_conserve3 {n in NN, r in R : n <> RO[r] && n <> RD[r]}:
        sum {l in L2, m in NN : n=LO[l] && m=LD[l]} x[l,r]
      - sum {l in L2, m in NN : n=LD[l] && m=LO[l]} x[l,r] = 0 ;
```

```
# ----------------------------------
# sets of route constraints

650: subject to maxhop {r in R}:
        sum {l in L2} xb[l,r] <= MAXHOP[r];

651: subject to maxdist{r in R}:
        sum {l in L2} xb[l,r]*DIST[l] <= MAXDIST[r];

652: subject to ind_demand1 {l in L2, r in R:BP[r]=1}:
        xb[l,r]*BW[r]/BK[r] = x[l,r];

653: subject to ind_demand2 {l in L2, r in R:BP[r]=0}:
        xb[l,r]*BW[r]/BK[r] >= x[l,r];

#----------------------------------------------------
sets of capacity constraints for L1 and L3 models, choose the relevant ones /*# defined for nondirectional links for layer L1 model
654: subject to capacity_cons {l in L}:
        sum {r in R} (x[l,r]+ x[l+NUMLINKS,r]) <= CAP[l] + v[l];
*/ for layer L3 model, routes represent tunnels and use the following two sets of constraints
defined for directional links
655: subject to capacity_cons1 {l in L}:
        sum {r in R} x[l,r] <= CAP[l] + v[l];

# defined for directional links
656: subject to capacity_cons2 {l in L2 diff L}:
        sum {r in R} x[l,r] <= CAP[l] + v[l-NUMLINKS];

# keep only for the no augmentation case
657: subject to capacity_cons3 :
        sum {l in L} v[l] = 0;
```

```
# ----------------------------------------------------------
diversity constraints for routes /* diversity constraints are meaningful only when xb[l,r] is binary and forces  splitting */
defined for nondirectional links
658: subject to link_diver_const {l in L}:
        sum {gd in GD, r in R, s in R: r != s && GDO[gd]=r && GDD[gd]=s }
            (xb[l,r] +xb[l+NUMLINKS,r] + xb[l,s] +xb[l+NUMLINKS,s]) <= 1 +y[l];

# total routes from an n to all m's
659: subject to node_const1 { n in NN , gd in GD}:
        sum {l in L2, m in NN : (n=LO[l] && m=LD[l])}
            (xb[l,GDO[gd]] + xb[l,GDD[gd]] ) <= 1 + z1gd[n,gd];

# total routes to an n from all m's
660: subject to node_const2 { n in NN , gd in GD}:
        sum {l in L2, m in NN : (m=LO[l] && n=LD[l])}
            (xb[l,GDO[gd]] + xb[l,GDD[gd]] ) <= 1 + z2gd[n,gd];

# defined for nondirectional links with bundle/SRLG data
661: subject to bundle_const { b in BD, gd in GD}:
        sum { m in BL[b]  } (xb[BLE[b,m],GDO[gd]] + xb[BLE[b,m],GDD[gd]] ) <= 1 +u[b,gd];
```

```
# -----------------------------------------------------------------------
# cost coefficients and penalties in the network_cost objective function
may be changed to guide the solution 662: minimize network_cost:
        sum { l in L , r in R } (x[l,r]+x[l+NUMLINKS,r])* DIST[l]
        + sum { l in L }  (FC + VC* v[l] * DIST[l])
        + sum {l in L} 100000*y[l]
        + sum {n in NN,gd in GD} 10*(z1gd[n,gd] + z2gd[n,gd])
        + sum { b in BD, gd in GD} 100000*u[b,gd]
        + 10000*sum {r in R} (1-xf[r])*BW[r]
        + 100000*sum {r in R} (1-xf[r])
        + 100000*xfb;
```

```
701: param NUMTIMES;                      # number of time periods
702: set TT :=1..NUMTIMES;                # set of time periods
703: param TIMES {t in TT};               # time period t 600: param NUMNODES ;                     # number of nodes
601: set NN := 1..NUMNODES ;              # set of nodes
602: param NODES {n in NN};               # node ID
603: param NUMLINKS ;                     # number of links
604: param NUMLINKS2 := 2*NUMLINKS;       # number of link directions
605: set L := 1..NUMLINKS;                # set of links a to z
606: set L2 := 1..NUMLINKS2;              # set of links a to z and z to a 607: param LO {l in L2};                  # links' originating nodes
608: param LD {l in L2};                  # links' destination nodes
609: param DIST {l in L2};                # distance of link, for 1<=l<=L DIST[l]=DIST[l+L]

710: param CAP {l in L2,t in TT};         # available link capacity defined for set L
                                          # for layer L1 model CAP[l]=CAP[L+l] and routed
                                          # demands on a link in both directions are additive
                                          # for layer L3 model, demands (tunnel loads) are
                                          # additive by direction 611: param FC;                            # augmentation fixed cost
612: param VC;                            # augmentation variable cost 613: param NUMR ;                         # number of requests for routes
614: set R := 1..NUMR;                    # set of routes
615: param RO {r in R};                   # set of route originating end point
616: param RD {r in R};                   # set of route destinations end points
617: param BW {r in R};                   # bandwidth requirement for route r
618: param BK {r in R};                   # split r into k subroutes,BK[r]=k, normally k=1
619: param BP {r in R};                   # if r has priority 1, BP[r]=1, xf[r]is set to
                                          # value of 1 and all its BW requests gets routed
                                          # otherwise, BP[r]=0, the model attempts to
                                          # accommodate the BW requests and uses fair
                                          # allocation (e.g., 0<=xf[r]<=1) between the
                                          # non-priority requests, if necessary
```

```
704: param TS {r in R};              # START time for route r requesting BW[r]
705: param TE {r in R};              # END time for route r request for BW[r]
706: set  RT {r in R} := TS[r]..TE[r];   # r active time range 620: param MAXHOP {r in R};          # max allowed number of hopes for route r
621: param MAXDIST {r in R};         # max allowed length of route r 622: param NUMGD ;                   # number of pairs of routes that require diversity
623: set GD := 1..NUMGD;             # set of pairs
624: param GDO {gd in GD};           # route GDO[gd] has to be diverse from route GDD[r]
625: param GDD {gd in GD};

626: param NUMBID;                   # number of bundle/SRLG ID constraints
627: set BD := 1..NUMBID;            # set of bundle ID constraints
628: param NLBD {b in BD};           # number of links associated with bundle b
629: set BL {a in BD} := 1..NLBD[a]; # set of links bundled by ID a
630: param BLE {b in BD, l in BL[b]};# their identity
631: param BDR{b in BD};             # bundle flow thru restriction normally = 1
632: param PENB {b in BD} ;          # penalty for bundle violation of diversity
```

FIG. 7B

```
733: var x{l in L2, r in R, t in TT} >=0;                    # route r consumption of l's BW at time t 734: var xb{l in L2, r in R, t in TT} >=0 <=BK[r], integer;  # when BK[r]=1, binary value forces
                                                             # one path; otherwise, when '>=0 <=BK[r]'
                                                             # may split the path 635: var xf{r in R} >=0 <=1;                                 # fraction of BW request for route r that
                                                             # are satisfied
636: var xfb >=0 <=1;                                        # auxiliary variable for fair allocation 737: var y{l in L2, t in TT} >=0;                            # link diversity violation measure
638: var z1gd {n in NN, gd in GD} >=0 ;                      # node diversity violations measures
639: var z2gd {n in NN, gd in GD} >=0;

740: var v{l in L, t in TT} >=0 ;                            # link capacity augmentation variable
641: var u{b in BD, g in GD} >=0;                            # bundle/SRLG diversity violation measure
```

\#  ------------------------------------------------
\# set of multi commodity constraints to establish routes possibly with splits 742: subject to node_conserveb1 {n in NN, r in R, t in RT[r] :t = TS[r] && n=RD[r] }:
    sum {l in L2, m in NN : n=LO[l] && m=LD[l]} xb[l,r,t]
    - sum {l in L2, m in NN : n=LD[l] && m=LO[l]} xb[l,r,t] = -BK[r];

743: subject to node_conserveb2 {n in NN, r in R, t in RT[r] : t= TS[r] && n=RO[r] }:
    sum {l in L2, m in NN : n=LO[l] && m=LD[l]} xb[l,r,t]
    - sum {l in L2, m in NN : n=LD[l] && m=LO[l]} xb[l,r,t] = BK[r];

744: subject to node_conserveb3 {n in NN, r in R , t in RT[r] : t= TS[r] && (n != RO[r] && n != RD[r]) }:
    sum {l in L2, m in NN : n=LO[l] && m=LD[l]} xb[l,r,t]
    - sum {l in L2, m in NN : n=LD[l] && m=LO[l]} xb[l,r,t] = 0 ;

780: subject to maintain_route_path {l in L2, r in R, t in RT[r]: t != TE[r]}:
    xb[l,r,t]=xb[l,r,t+1];

\# ------------------------------------------------
\# set of multicommodity constraints to route BW requests for priority and non priority demands
\# BW requests are maintained between TS[r] and TE[r]

745: subject to node_conserve1 {n in NN, r in R ,t in RT[r]: t = TS[r] && n=RD[r] }:
    sum {l in L2, m in NN : n=LO[l] && m=LD[l]} x[l,r,t]
    - sum {l in L2, m in NN : n=LD[l] && m=LO[l]} x[l,r,t] = -BW[r]*xf[r];

746: subject to node_conserve2 {n in NN, r in R , t in RT[r]: t = TS[r] && n=RO[r] }:
    sum {l in L2, m in NN : n=LO[l] && m=LD[l]} x[l,r,t]
    - sum {l in L2, m in NN : n=LD[l] && m=LO[l]} x[l,r,t] = BW[r]*xf[r];

749: subject to node_conserve3 {n in NN, r in R, t in RT[r]: t = TS[r] && (n != RO[r] && n != RD[r]) }:
    sum {l in L2, m in NN : n=LO[l] && m=LD[l]} x[l,r,t]
    - sum {l in L2, m in NN : n=LD[l] && m=LO[l]} x[l,r,t] = 0;

647: subject to priority_allocation {r in R: BP[r]=1}:
    xf[r]=1;

\# <= equalizes BW.  = equalizes %
648: subject to fair_allocation {r in R: BP[r]=0}:
    xf[r] <= xfb;

781: subject to maintain_route_flow {l in L2, r in R, t in RT[r]: t != TE[r]}:
    x[l,r,t]=x[l,r,t+1];

```
# ----------------------------------------
# sets of route constraints

750: subject to maxhop {r in R, t in TT}:
        sum {l in L2} xb[l,r,t] <= MAXHOP[r];

751: subject to maxdist{r in R, t in TT}:
        sum {l in L2} xb[l,r,t]*DIST[l] <= MAXDIST[r];

752: subject to ind_demand1 {l in L2, r in R, t in TT :BP[r]=1}:
        xb[l,r,t]*BW[r]/BK[r]  =  x[l,r,t];

753: subject to ind_demand2 {l in L2, r in R, t in TT :BP[r]=0}:
        xb[l,r,t]*BW[r]/BK[r]  >=  x[l,r,t];

#--------------------------------------------------
sets of capacity constraints for L1 and L3 models, choose the relevant ones /*
defined for nondirectional links
754: subject to capacity_cons {l in L, t in TT}:
        sum {r in R} (x[l,r,t]+ x[l+NUMLINKS,r,t]) <= CAP[l,t] + v[l];
*/ defined for directional links
755: subject to capacity_cons1 {l in L,t in TT}:
        sum {r in R} x[l,r,t] <= CAP[l,t] + v[l,t];

# defined for directional links
756: subject to capacity_cons2 {l in L2 diff L, t in TT}:
        sum {r in R} x[l,r,t] <= CAP[l,t] + v[l-NUMLINKS,t];

# no augmentation
757: subject to capacity_cons3 :
        sum {l in L, t in TT} v[l,t] = 0;
```

```
# ------------------------------------------------------------
diversity constraints for routes /*
diversity constraints are meaningful only when xb[l,r] is binary and forces splitting
# defined for nondirectional links
758: subject to link_diver_const {l in L,t in TT}:
        sum {gd in GD, r in R, s in R: r != s && GDO[gd]=r && GDD[gd]=s }
            (xb[l,r,t] +xb[l+NUMLINKS,r,t] + xb[l,s,t] +xb[l+NUMLINKS,s,t]) <= 1+y[l,t];

# total routes from an n to all m's
759: subject to node_const1 { n in NN , gd in GD, t in TT}:
        sum {l in L2, m in NN : (n=LO[l] && m=LD[l])}
            (xb[l,GDO[gd],t] + xb[l,GDD[gd],t] ) <= 1 + z1gd[n,gd];

# total routes to an n from all m's
760: subject to node_const2 { n in NN , gd in GD, t in TT}:
        sum {l in L2, m in NN : (m=LO[l] && n=LD[l])}
            (xb[l,GDO[gd],t] + xb[l,GDD[gd],t] ) <= 1 + z2gd[n,gd];

# defined for nondirectional links with bundle/SRLG data
761: subject to bundle_const { b in BD, gd in GD,t in TT}:
        sum { m in BL[b]  } (xb[BLE[b,m],GDO[gd],t] + xb[BLE[b,m],GDD[gd],t] ) <= 1 +u[b,gd];
*/
```

FIG. 7F

```
# ----------------------------------------------------------------
# cost coefficients and penalties in the network_cost objective function
may be changed to guide the solution 762: minimize network_cost:
        sum { l in L , r in R ,t in TT} (x[l,r,t]+x[l+NUMLINKS,r,t])* DIST[l]
        + sum { l in L ,t in TT}  (FC + VC* v[l,t] * DIST[l])
        + sum {l in L, t in TT} 100000*y[l,t]
        + sum {n in NN,gd in GD} 10*(z1gd[n,gd] + z2gd[n,gd])
        + sum { b in BD, gd in GD} 100000*u[b,gd]
        + 10000*sum {r in R} (1-xf[r])*BW[r]
        + 1000000*sum {r in R} (1-xf[r])
        + 1000000*xfb;
```

CENTRALIZED ROUTE DETERMINATION IN COMMUNICATION NETWORKS

FIELD OF THE DISCLOSURE

This disclosure relates generally to network routing and, more particularly, to centralized route determination in communication networks.

BACKGROUND

In software defined networks (SDNs), data plane processing, which includes the physical forwarding of data from sources to destinations, is decoupled from control plane processing, which includes making decisions concerning which routes in the SDN are to be used to forward the data from the sources to the destinations. Due to this decoupling, it is expected that routing decisions for at least some future SDNs will be made by a centralized network controller residing in the cloud. It is further expected that such a centralized network controller will have access to real time data concerning the topology and state of the SDN, and will receive requests to provide routes (e.g., end-to-end data path connections) for network traffic flows. Such requests may include flow routing requests for rerouting of flows due to traffic surges and/or failure events, as well as occasional new routing requests (e.g. between data centers), possibly for limited durations of time.

BRIEF DESCRIPTION OF THE DRAWINGS

FIGS. 6A-G illustrate a first example script that may be constructed by the example constraint specifiers of FIGS. 2 and/or 3 for processing by an example linear programming engine included in the example network controllers of FIGS. 1 and/or 2 to determine routes for routing flows in the example network of FIG. 1.

FIGS. 7A-G illustrate a second example script that may be constructed by the example constraint specifiers of FIGS. 2 and/or 3 for processing by an example linear programming engine included in the example network controllers of FIGS. 1 and/or 2 to determine routes for routing limited duration flows in the example network of FIG. 1.

Wherever possible, the same reference numbers will be used throughout the drawing(s) and accompanying written description to refer to the same or like parts, elements, etc.

DETAILED DESCRIPTION

Figure 1:
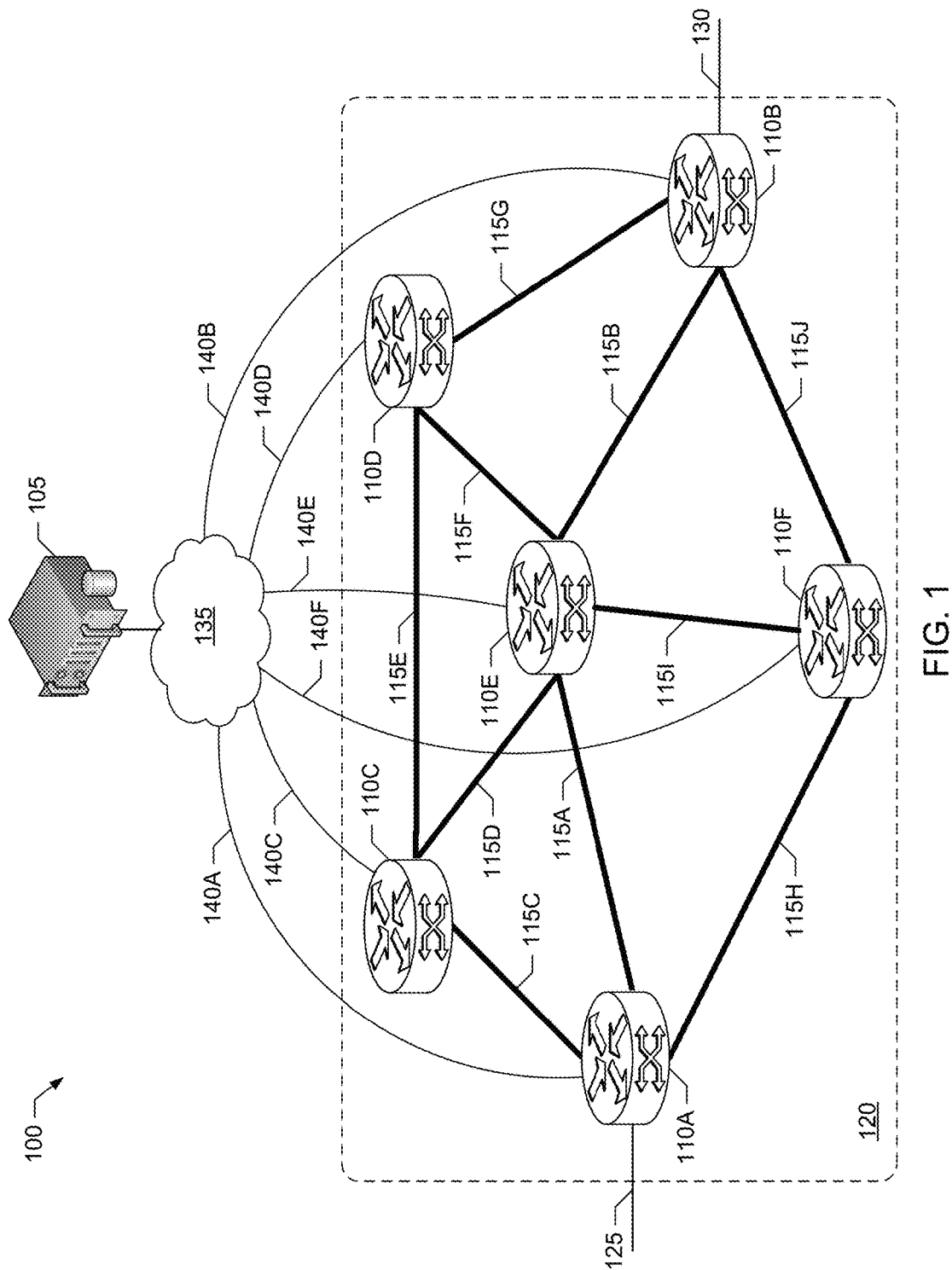
FIG. 1 is a block diagram of an example communication network including an example network controller to perform centralized route determination in accordance with the teachings of this disclosure.

Methods, apparatus and articles of manufacture (e.g., physical storage media) to perform centralized route determination in communication networks (e.g., such as software defined networks) are disclosed herein. Example methods disclosed herein for route determination include accessing, with a controller of a software defined network, a first set of constraints specifying whether route splitting is permissible for respective ones of a set of flows in the software defined network. Such disclosed example methods also include accessing, with the controller, a second set of constraints specifying respective bandwidth demands for the respective ones of the set of flows in the software defined network. Such disclosed example methods further include determining, based on the first and second sets of constraints, and with a linear programming model implemented by the controller, a set of routes to route the set of flows in the software defined network.

In some such disclosed example methods, determining the set of routes includes determining whether a combination of the first and second sets of constraints specified for the set of flows is able to be satisfied in the software defined network. Such disclosed example methods also include, when the combination of the first and second sets of constraints specified for the set of flows is not able to be satisfied, determining the set of routes to meet a combination of a first subset of the first set of constraints and a first subset of the second set of constraints specified for a first subset of the set of flows having a first priority, but to not meet a combination of a second subset of the first set of constraints and a second subset of the second set of constraints specified for a second subset of the set of flows having a second priority different from the first priority. In some such disclosed example methods, the determined set of routes includes a set of nodes and a set of links, and the example methods further include allocating the respective bandwidth demands (e.g., fully) for the first subset of the set of flows to the set of links, and performing a fair allocation of link bandwidth among the second subset of the set of flows (e.g., to thereby allocate portions of the respective bandwidth demands, but possibly not the full respective bandwidth demands) for the second subset of the set of flows to the set of links). Additionally or alternatively, some such disclosed example methods also include, when the combination of the first and second sets of constraints specified for the set of flows is not able to be satisfied by the set of routes, determining a set of link augmentation recommendations for augmenting link capacity in the software defined network to permit the combination of the first and second sets of constraints specified for the set of flows to be satisfied by the set of routes.

Additionally or alternatively, in some such disclosed example methods, the first set of constraints includes a set of integers specifying largest numbers of concurrent paths over which respective ones of the set of flows are permitted to be routed. In some such disclosed examples, the second set of constraints includes a first bandwidth demand specified for a first one of the set of flows, and the set of routes includes a first route specified by a set of nodes and a set of links in the software defined network that are to route at least respective portions of the first bandwidth demand to meet a combination of the first and second sets of constraints Additionally or alternatively, some such disclosed example methods further include configuring a third set of constraints selected from a group of different selectable sets of constraints. Such disclosed example methods also include determining, with the linear programming model, the set of routes based on the first, second and third sets of constraints.

Additionally or alternatively, some such disclosed example methods further include transmitting routing information from the controller to a set of nodes of the software defined network to cause routing tables maintained by respective ones of the set of nodes to be updated to implement the set of routes.

Additionally or alternatively, in some such disclosed example methods (e.g., which support bandwidth calendaring), the second set of constraints specifies respective first (e.g., limited duration) bandwidth demands expected at a future first time for the respective ones of the set of flows in the software defined network, the set of routes is a first set of routes to route the set of flows in the software defined network at the first time, and the determining of the first set of routes is performed prior to the first time. Some such disclosed example methods further include accessing, prior to the first time, a third set of constraints specifying respective second (e.g., limited duration) bandwidth demands expected at a future second time later than the first time for the respective ones of the set of flows in the software defined network, and determining, based on the first and third sets of constraints, and with the linear programming model prior to the first time, a second set of routes to route the set of flows in the software defined network at the second time. Such disclosed example methods also include transmitting first routing information to a first set of nodes of the software defined network prior to the first time to cause routing tables maintained by respective ones of the first set of nodes to be updated to implement the first set of routes at the first time, and transmitting second routing information to a second set of nodes of the software defined network after the first time and prior to the second time to cause routing tables maintained by respective ones of the second set of nodes to be updated to implement the second set of routes at the second time.

These and other example methods, apparatus, systems and articles of manufacture (e.g., physical storage media) to perform centralized route determination in communication networks (e.g., such as software defined networks) are disclosed in further detail below.

As noted above, in at least some future SDNs, routing decisions will likely be made in a centralized network controller (e.g., residing in the cloud) that receives requests to provide routes for network traffic flows. However, many route determination techniques employed in current communication networks assume routing decisions are decentralized and performed at individual nodes (e.g., routers) implementing the network, rather than at a centralized point, such as a cloud-based, centralized network controller. For example, some prior approaches for responding to flow routing requests rely on sequential use of a shortest path algorithm (e.g., such as a constrained and/or disjoint shortest path algorithm) performed at different nodes in the network at the time of the routing request, followed by subsequent adjustments of the left-over link capacities. Other prior approaches for responding to flow routing requests rely on pre-calculations of a finite set of potential short routes and use of an arc-route linear programming model for route selection. However, such prior approaches may not provide globally optimal routing solutions, and in some instances may not be able to accommodate the bandwidth demands for a complete set of network flows, such as when a network operates at high utilization.

Unlike such prior, decentralized routing approaches, example methods, apparatus, systems and articles of manufacture (e.g., physical storage media) disclosed herein implement route determination techniques that provide a centralized technical solution to the technical problem of routing flows in a communication network, such as an SDN. For example, some disclosed example route determination techniques utilize a linear programming model to determine a routing solution for routing flow demands in an SDN that satisfies at least two different sets of constraints. As described above and in further detail below, in some examples, a first set of such constraints specifies whether route splitting is permissible for respective ones of a set of flows in the SDN, and the second set of constraints specifies respective bandwidth demands for the respective ones of the set of flows in the SDN.

In some disclosed example route determination techniques, the linear programming model is also able to determine a routing solution for routing flow demands in an SDN that satisfies further sets of constraints (e.g., in addition to the two aforementioned different sets of constraints). In some such examples, the further set(s) of constraints to be satisfied by the routing solution determined by the linear programming model is(are) selected from a group of different, selectable sets of constraints. For example, the group of selectable sets of constraints may include performance-related constraints (e.g., such as routing distance constraints, routing hop constraints, routing diversity constraints, etc.), architecture-related constraints (e.g., such as link capacity constraints, shared risk link group and/or bundling constraints, etc.), etc., a disclosed in further detail below.

As also disclosed in further detail below, when the linear programming model is unable to determine a routing solution that satisfies the combination of the different sets of constraints, some example route determination techniques implemented in accordance with the teachings of the present disclosure determine a routing solution that satisfies the combination of the two different sets of constraints for a subset of the flows (e.g., such as a subset of priority flows), but does not satisfy the combination of the two different sets of constraints for another subset of the flows (e.g., such as a subset of default flows). Additionally or alternatively, when the linear programming model is unable to determine a routing solution that satisfies the combination of these different sets of constraints, some example route determination techniques implemented in accordance with the teachings of the present disclosure determine a set of link augmentation recommendations for augmenting link capacity in the SDN to permit the combination of the different sets of constraints specified for the set of flows to be satisfied by the routing solution.

Turning to the figures, a block diagram of an example communication network 100 including an example network controller 105 to perform centralized route determination in accordance with the teachings of the present disclosure is illustrated in FIG. 1. The communication network 100 of the illustrated example includes a set of example network nodes 110A-F interconnected by an example set of communication links 115A-J. The example nodes 110A-F may be implemented by any type(s), number(s) and/or combination(s) of one or more routers, switches, gateways, computers, etc. The example links 115A-J may be implemented by any type(s), number(s) and/or combination(s) wireless communication links, wired communication links, optical communication links, etc. Additionally or alternatively, the links 115A-J may be implemented by one or more physical links, logical links, virtual links, etc., in one or more wireless communication networks, wired communication networks, optical communication networks, etc.

In the illustrated example of FIG. 1, the nodes 110A-F form an example core network 120 to route flows (e.g., data packets) between different pairs of origination and destination nodes using the links 115A-J. In the example network 100 of FIG. 1, the links 115A-J form a partial mesh topology interconnecting the nodes 110A-F. In contrast with a full mesh topology, in which each network router is connected with every other network router, in a partial mesh topology, some routers in a partial mesh topology are not directly connected to one another. Thus, in a partial network topology, a flow routed between a pair of origination and destination nodes may use a route (also referred to herein as a path) containing multiple ones of the links 115A-J, which is referred to herein as a multi-link route (or a multi-link path). Furthermore, in some examples, even if a pair of origination and destination nodes is directly connected, a flow between the pair of nodes may still use a multi-link route.

For example, in the example network 100 of FIG. 1, the nodes 110A and 110B are not directly connected. Thus, a flow to be routed from an example ingress point 125 of the example core network 120 to an example egress point 130 of the core network 120 may be routed between nodes 110A and 110B using a multi-link route, such as the route containing the links 115A and 115B, or the route containing the links 115H and 115J, or the route containing the links 115C, 115E and 115G, etc. Also, in the example network 100 of FIG. 1, the nodes 110A and 110E are directly connected by the link 115A and, thus, traffic may be routed between nodes 110A and 110E using just the single link 115A. However, in some examples, traffic routed between the nodes 110A and 110E may additionally or alternatively use a multi-link path, such as the path containing the links 115C and 115D, or the path containing the links 115H, 115J and 115B, etc.

In the illustrated example of FIG. 1, the network 100 employs a communication protocol, such as the MPLS-TE protocol, that defines tunnels between pairs of the nodes 110A-F for routing data between the node pairs. For example, for a given pair of the nodes 110A-F, the MPLS-TE protocol may establish one or more tunnels (e.g., such as in the case of route splitting) for routing a flow between the pair of nodes. In some examples, the tunnels are unidirectional such that, for a given pair of the nodes 110A-F, one node is the origination node and the other node is the destination node for a first flow being routed in one direction, whereas the origination and destination roles are reversed for a second flow being routed in the other direction.

For a given tunnel, the pair of nodes 110A-F terminating the tunnel are referred to herein as endpoint nodes. As described above, the MPLS-TE protocol implements a tunnel between a pair of endpoint nodes 110A-F using a route (path) containing a group of one or more of the links 115A-J. For example, a tunnel between the nodes 110A and 110B could be implemented using a first route containing the links 115A and 115B, a second route containing the links 115H and 115J, a third route containing the links 115C, 115E and 115G, a fourth route containing the links 115C, 115D, 115F and 115G, etc.

In the illustrated example of FIG. 1, the network 100 corresponds to an example SDN in which the example nodes 110A-F and the example links 115A-J implement the data plane of the SDN. The example network 100 of FIG. 1 also includes the example network controller 105 to implement the control plane of the SDN. Furthermore, the example network controller 105 is implemented in an example network cloud 135 (e.g., as a cloud-based service) and is in communication with the nodes 110A-F via respective example communication links 140A-F. The example communication links 140A-F may be implemented by any type(s), number(s) and/or combination(s) wireless communication links, wired communication links, optical communication links, etc. Additionally or alternatively, the communication links 140A-F may be implemented by one or more physical links, logical links, virtual links, etc., in one or more wireless communication networks, wired communication networks, optical communication networks, etc. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In the illustrated example, the network controller 105 monitors the state of the network 100 by receiving state information reported from the nodes 110A-F. For example, the network state information received by the network controller 105 from a given one of the nodes 110A-F includes, but is not limited to, link capacities for the link(s) 115A-J terminated at the given node, traffic volume(s) for the flows(s) associated with the given node (e.g., for which the given node is an endpoint), etc. The nodes 110A-F may report the state information to the network controller 105 via the communication links 140A-F at regular or irregular reporting intervals, based on the occurrence of one or more events (e.g., such as when a network failure event is detected, when a query is received from the network controller 105, etc.), etc., or any combination thereof.

Additionally, the network controller 105 of the illustrated example determines routes for routing flows in the network 100. For example, the example network controller 105 of FIG. 1 may receive flow routing requests from the nodes 110A-F (e.g., via the links 140A-F), from an operations and management system, from a computer terminal, etc., or any combination thereof. As disclosed in further detail below, such routing requests may specify, for example, the origination and destination endpoint nodes of flows to be routed in the network 100, flow routing constraints (e.g., such as bandwidth demand constraints, route splitting constraints, etc.) for the flows, priority designations for the flows, routing solution parameters (e.g., such as whether fair allocation is allowed if all of the flow routing constraints are unable to be met, whether link augmentation recommendations are to be provided if all of the flow routing constraints are unable to be met, etc.), etc. As also disclosed in further detail below, the example network controller 105 implements a linear programming model in accordance with the teachings of this disclosure to determine a routing solution for routing the flows in network 100, which satisfies a combination of constraints and other parameters specified in the received flow routing requests.

When a routing solution specifying a set of routes that satisfies the specified combination of constraints and other parameters is determined for the respective set of flows in the network 100, routing information describing the set of nodes 110A-F and set of links 115A-J implementing the determined set of routes is communicated by the network controller 105 to the nodes 110A-F via the communication links 140A-F, which causes routing tables maintained by respective ones of the set of nodes 110A-F to be updated to implement the set of routes. In some examples, when the linear programming model of the network controller 105 is unable to determine a routing solution that fully satisfies the combination of constraints and other parameters specified in the received flow routing requests, the network controller 105 determines a routing solution specifying a set of routes that partially satisfies the specified combination of constraints and other routing parameters. Additionally or alternatively, when the linear programming model of the network controller 105 is unable to determine a routing solution that fully satisfies the combination of constraints and other parameters specified in the received flow routing requests, the network controller 105 provides (e.g., to an operations and management system, to a computer terminal, etc.) link augmentation recommendations for augmenting link capacity in the network 100 to permit the constraints and other parameters specified in the received flow routing requests to be satisfied by the set of routes determined by the linear programming model.

In some examples, the example network controller 105 performs an initial routing procedure in which routing configuration information is initially specified by, for example, a network administrator via an operations and management system, a computer terminal, etc., or any combination thereof. The routing configuration information specifies, for example, routing endpoint information for an initial set of flows to be routed in the network 100, routing constraints for the initial flows, priority designations for the initial flows, routing solution parameters to be used by network controller 105 to solve for the set of routes to route the initial flows, etc. Then, after determining an initial routing solution specifying an initial set of routes for routing the initial flows in the network 100, and providing this information to the set of nodes 110A-F, the network controller 105 subsequently receives updated routing requests and determines updated routing solutions specifying new sets of routes for routing the flows in the network 100. The network controller 105 in such examples then provides updated routing information to the set of nodes 110A-F of the network 100 to cause the routing tables in the nodes to be updated to support the new sets of routes as the new routing solutions are determined.

In some examples, some routing requests are received by the network controller 105 in response to detection (e.g., by the nodes 110A-F, an operations and management system, etc.) of rerouting events, such a traffic surges, network failures, etc. In some such examples, such routing requests include the information described above, and are characterized as having random arrival times (typically) and may have immediate start times (e.g., with rerouting to occur immediately, or as soon as possible after receipt of routing requests) with no end times. As such, the routing solutions determined by the network controller 105 in response to such requests are typically independent of time (or may be referred to as single time period solutions) and, for example, are to take effect immediately (e.g., or as soon as the network controller 105 can provide the routing information specifying the routing solutions to the nodes 110A-F).

Additionally or alternatively, in some examples, the network controller 105 receives other routing requests corresponding to a bandwidth calendaring request or other routing request for routes to support flows scheduled to occur at specific times and for specific durations (which may or may not be overlapping). In some such examples, such routing requests include the information described above, and are characterized as having random arrival times (typically), but also having specified future start times and future end times. As such, the routing solutions determined by the network controller 105 in response to such requests are typically dependent on time (or may be referred to as multi time period solutions) and, for example, are to take effect at the specified future start times and are to last for durations corresponding to the specified future end times. Accordingly, in some such examples, the network controller 105 may determine those time-dependent routing solutions at any time prior to their specified start times, but wait to provide the corresponding routing information specifying the routing solutions to the nodes 110A-F such that the routing solutions do not take effect until the specified start times. Moreover, the network controller 105 may determine further routing information that is to be provided to the nodes 110A-F to cause the routing solutions to cease having an effect after the specified end times. For example, the network controller 105 may receive a first routing request for routes having a first future start time and a second routing request for routes having a second future start time later than the first start time. In some such examples, the network controller 105 may determine both a first routing solution corresponding to the first routing request and a different second routing solution corresponding to the second routing request prior to the first start time. However, the network controller 105 may then transmit first routing information associated with the first routing solution to the nodes 110A-F prior to the first start time, but then wait to transmit second routing information associated with the second routing solution to the nodes 110A-F until a later time that is prior to the second start time.

Although the example network 100 of FIG. 1 is described as corresponding to an SDN, centralized route determination as implemented by the example network controller 105 in accordance with the teachings of this disclosure is not limited thereto. On the contrary, centralized route determination as implemented by the example network controller 105 can be used to provide routing information in any networks having nodes capable of receiving routing information from an external source. Furthermore, although the example network 100 of FIG. 1 is illustrated as including six (6) nodes 110A-F and ten (10) links 115A-J, centralized route determination as implemented by the example network controller 105 in accordance with the teachings of this disclosure is not limited thereto. On the contrary, centralized route determination as implemented by the example network controller 105 can be used to provide routing information to any number of nodes 110A-F interconnected by any number of links 115A-J.

Figure 2:
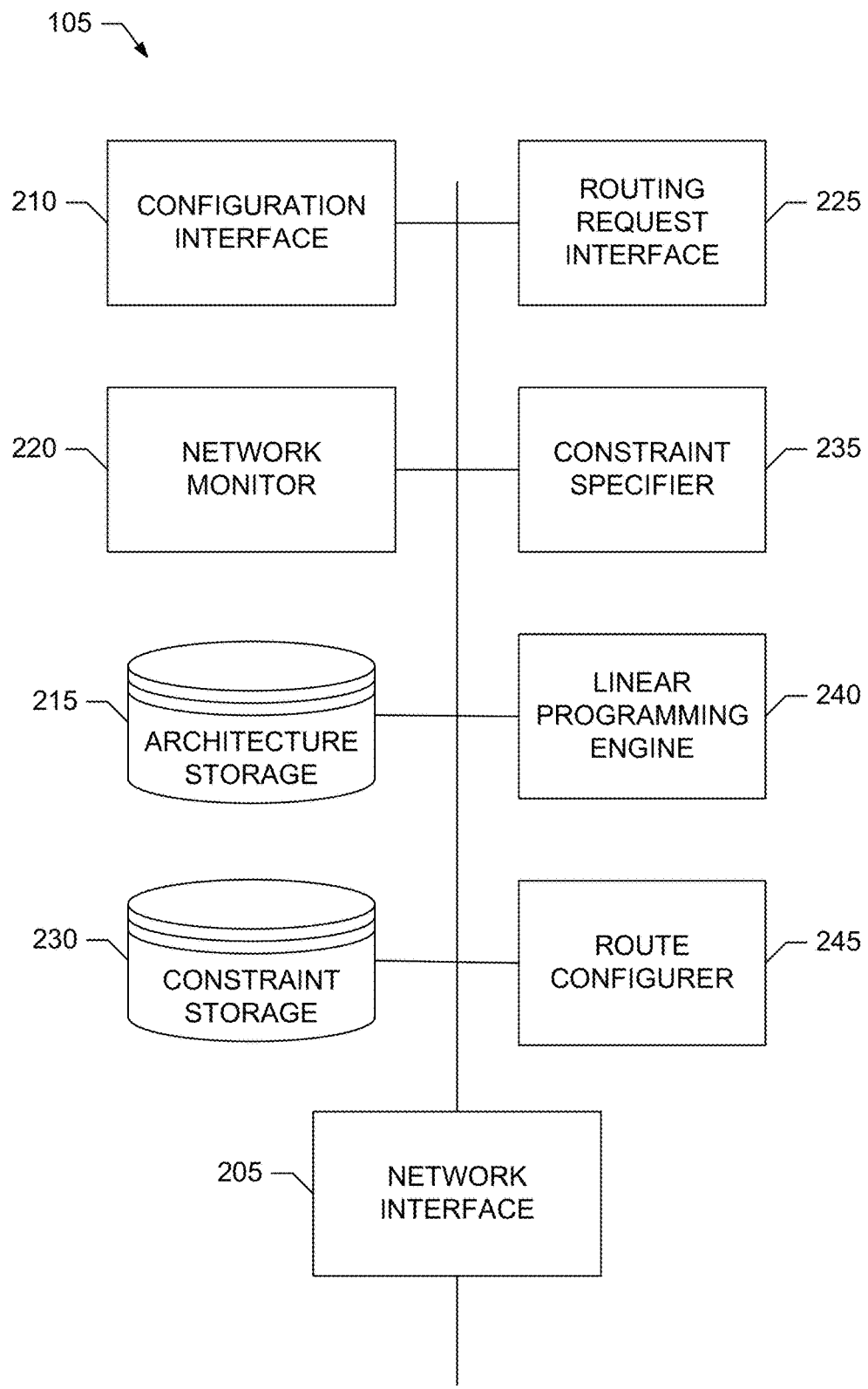
FIG. 2 is a block diagram illustrating an example implementation of the network controller included in the example network of FIG. 1.

A block diagram of an example implementation of the network controller 105 of FIG. 1 is illustrated in FIG. 2. The example network controller 105 of FIG. 2 includes an example network interface 205 to interface the network controller 105 with cloud 135 and/or the nodes 110A-F via one or more communication links, such as one or more of the example links 140A-F of FIG. 1. The example network interface 205 can be implemented by any type(s), number(s) and/or combination(s) of network interfaces, such as the example interface circuit 920 of FIG. 9, which is described in further detail below.

The example network controller 105 of FIG. 2 also includes an example configuration interface 210 to receive (e.g., via the network interface 205) network architecture information describing the architecture of, for example, the network 100. For example, the configuration interface 210 may receive network architecture information from an operations and management system, from a computer terminal, etc., or any combination thereof. Such network architecture information can include, but is not limited to, information describing the nodes 110A-F included in the network 100, information describing the links 115A-J (e.g., such as the initial capacities of the respective links 115A-J), information describing how the nodes 110A-F are interconnected by the links 115A-J (e.g., such as information specifying the origination and destination nodes 110A-F of each link 115A-J), information specifying groups of links associated with a bundle or shared risk link group (SRLG) and, as such, including common components such that the group of links are to be considered as a single unit for routing purposes, etc. In the illustrated example, the configuration interface 210 stores the network architecture information in an example network architecture storage 215. The example network architecture storage 215 may be implemented by any number(s) and/or type(s) of volatile and/or non-volatile memory, storage, etc., or combination(s) thereof, such as the example volatile memory 914 and/or the example mass storage device(s) 928 included in the example of FIG. 9.

The example network controller 105 of FIG. 2 further includes an example network monitor 220 to receive network state information reported from the nodes 110A-F. In the illustrated example of FIG. 2, the network monitor 220 stores the reported state information with the network architecture information maintained in the example architecture storage 215. In some examples, the network state information received by the network monitor 220 includes link capacity information reporting the available capacities of the respective links 115A-J of the network 100. In some examples, such as when the network controller 105 is to determine routing solutions for the physical layer or other lower layers of the network 100 (e.g., such as the L1 layer of a telecommunications network), the links 115A-J are modeled by the network controller 105 as bidirectional circuits and, thus, the different flows allocated to a link are assumed to consume the link's bidirectional capacity additively. For example, if a first flow allocated to the link 115A has a bidirectional bandwidth of 20 Giga-bits per second (Gbps), and a second flow allocated to the link 115A has a bidirectional bandwidth of 10 Gbps, then the total bidirectional bandwidth is 20+10=30 Gbps. However, in other examples, such as when the network controller 105 is to determine routing solutions for higher layers (e.g., such as the L3 layer of a telecommunications network), the links 115A-J are modeled by the network controller 105 as unidirectional tunnels and, thus, the different flows allocated to a link are assumed to consume the link's unidirectional capacity additively in the direction of the flows. In such examples, the overall utilization of the link is then the maximum of the total utilization between the two different directions. For example, if a first flow allocated to the link 115A has a unidirectional bandwidth of 20 Giga-bits per second (Gbps) in one direction, and a second flow allocated to the link 115A has a unidirectional bandwidth of 10 Gbps in the other direction, then the total bidirectional bandwidth is max{20 Gbps, 10 Gbps}=20 Gbps.

The example network controller 105 of FIG. 2 further includes an example routing request interface 225 to receive (e.g., via the example network interface 205) flow routing requests from the nodes 110A-F (e.g., via the links 140A-F), from an operations and management system, from a computer terminal, etc., or any combination thereof. In the illustrated example, the routing requests received by the routing request interface 225 include routing constraint information. In some examples, the configuration interface 210 also receives (e.g., via the example network interface 205) routing constraint information from an operations and management system, from a computer terminal, etc., or any combination thereof.

For example, the routing constraint information received by routing request interface 225 and/or the configuration interface 210 may include, but is not limited to, flow specification information providing constraints characterizing the flows to be routed in the network 100, routing solution parameters specifying constraints to be applied when determining a routing solution, etc. In some examples, the flow specification information includes, but is not limited to, information specifying (i) the origination and destination endpoint nodes 110A-F of flows to be routed in the network 100, (ii) flow routing constraints (e.g., such as bandwidth demand constraints, route splitting constraints, etc.) for the flows, priority designations for the flows, etc., as described above. In some examples, the routing solution parameters include, but are not limited to, parameters specifying whether fair allocation is allowed if the flow routing constraints are unable to be met, whether link augmentation recommendations are to be provided if the flow routing constraints are unable to be met, etc., as described above. In some examples, the routing solution parameters additionally or alternatively specify a cost function to be used (e.g., to be reduced, minimized, etc.) to determine a routing solution for routing the specified flows in the network 100. Example flow specification information and routing solution parameters capable of being included in the routing constraint information received by the configuration interface 210 is described in further detail below.

In the illustrated example of FIG. 2, the network controller 105 includes an example constraint storage 230 to store the routing constraint information received by the routing request interface 225 and/or the configuration interface 210. The example constraint storage 230 may be implemented by any number(s) and/or type(s) of volatile and/or non-volatile memory, storage, etc., or combination(s) thereof, such as the example volatile memory 914 and/or the example mass storage device(s) 928 included in the example of FIG. 9.

The example network controller 105 of FIG. 2 includes an example constraint specifier 235 to assemble different sets of constraints, which are to be met by the set of routes included in a routing solution for routing the specified flows in the network 100, based on the routing constraint information stored in the example constraint storage 230. In some examples, the constraint specifier 235 formats the different sets of constraints as sets of linear equalities (e.g., corresponding to mathematical relationships characterized by having equals signs) and/or linear inequalities (e.g., corresponding to mathematical relationships characterized by having signs other than the equals sign, such as less than signs, greater than signs, less than or equals signs, greater than or equals signs, not equals signs, etc.) to be solved (e.g., simultaneously) by an example linear programming engine 240 also included in the example network controller 105 of FIG. 2. For example, the linear programming engine 240 may be implemented by IBM's® CPLEX solver, and/or any other type of linear programming solver capable of determining solutions to sets of linear constraints (e.g., sets of linear equalities and/or inequalities). In some such examples, the constraint specifier 235 specifies the different sets of constraints as a script conforming to a programming language, such as A Mathematical Programming Language (AMPL) or some other language, capable of being interpreted by the linear programming engine 240. Example sets of constraints capable of being assembled by the constraint specifier 235 are disclosed in further detail below. In the illustrated example of FIG. 2, the routing solution determined by the linear programming engine 240 based on the sets of constraints assembled by the constraint specifier 235 is provided to an example route configurer 245, which configures the set of nodes 110A-F of the network 100 according to the routing solution.

Figure 3:
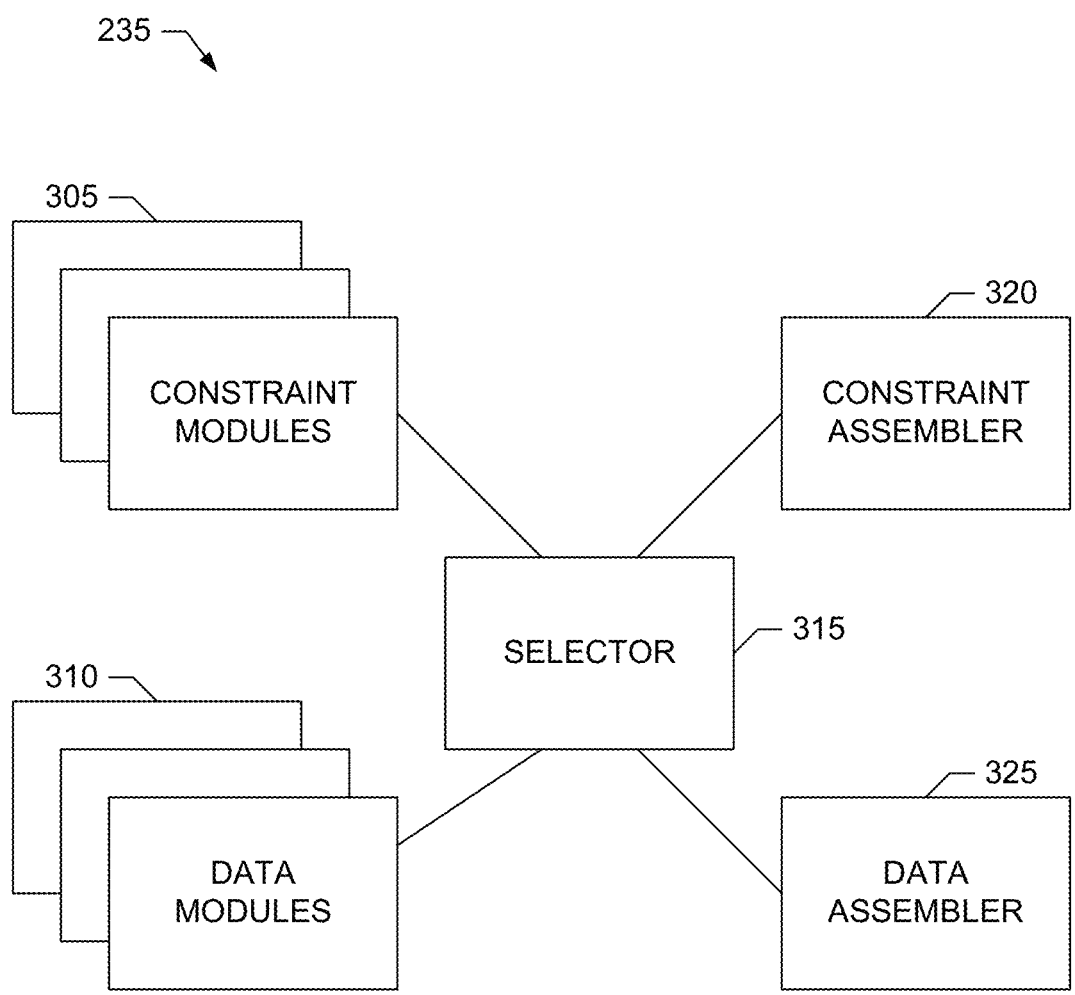
FIG. 3 is a block diagram of an example implementation of an example constraint specifier that may be included in the example network controllers of FIGS. 1 and/or 2.

In some examples, the constraint specifier 235 assembles the different sets of constraints from different modules specifying respective different individual sets of constraints or groupings of sets of constraints. An example implementation of such a constraint specifier 235 is illustrated in FIG. 3. Turning to FIG. 3, the illustrated example constraint specifier 235 includes example constraint modules 305 containing respective individual sets of constraints, or groups of constraints, that could be selected or otherwise configured as constraints to be satisfied by a routing solution determined for the set of specified flows to be routed in the network 100. In some examples, different ones of the constraint modules 305 contain different component scripts specifying the respective individual sets of constraints, or groups of constraints, as linear equalities and/or inequalities in a programming language (e.g., AMPL). For example, a first constraint module 305 may include a first set of linear equalities and/or inequalities corresponding to a first set of constraints specifying whether route splitting is permissible for respective ones of a set of flows to be routed in the network 100, a second constraint module 305 may include a second set of linear equalities and/or inequalities corresponding to a second set of constraints specifying respective bandwidth demands for the respective ones of the set of flows, a third constraint module 305 may include a third set of linear equalities and/or inequalities corresponding to a third set of constraints specifying one or more performance-related constraints (e.g., such as routing distance constraints, routing hop constraints, routing diversity constraints, etc.) for the respective ones of the set of flows, a fourth constraint module 305 may include a fourth set of linear equalities and/or inequalities corresponding to a fourth set of constraints specifying one or more architecture-related constraints (e.g., such as link capacity constraints, shared risk link group and/or bundling constraints, etc.) to be satisfied by the routing solution, etc. In some examples, the constraint modules 305 are provided to the network controller 105 via the configuration interface 210 (e.g., and further via the example network interface 205) and stored in the example constraint storage 230.

In some examples, the constraint specifier 235 of FIG. 3 includes example data modules 310 containing respective data, or groups of data, that could be selected or otherwise used by the example linear programming engine 240 to determine the routing solution for routing the set of flows in the network 100. For example, different ones of the data modules 310 could contain architecture data that could be selected and/or configured to represent the architecture of the network 100. In some examples, the data modules 310 are provided to the network controller 105 via the configuration interface 210 (e.g., and further via the example network interface 205) and stored in the example architecture storage 215.

The example the constraint specifier 235 of FIG. 3 further includes an example selector 315 to select one or more of the example constraint modules 305 and/or the example data modules 310 to be used to determine the routing solution for routing the set of specified flows in the network 100. In some examples, the selector 315 is configured by selection information received via the configuration interface 210 (e.g., and further via the example network interface 205). Additionally or alternatively, in some examples, the selector 315 is configured by selection information included in the routing requests received by the routing request interface 225.

The example the constraint specifier 235 of FIG. 3 also includes an example constraint assembler 320 to assemble the constraint module(s) 305 selected by the selector 315 to form a complete set of constraints to be solved by the example linear programming engine 240 to determine the routing solution for routing the set of specified flows in the network 100. For example, the constraint assembler 320 may assemble the selected constraint module(s) 305 into a single script conforming to a programming language (e.g., AMPL) capable of being interpreted by the linear programming engine 240. In some examples, the constraint specifier 235 of FIG. 3 further includes an example data assembler 325 to assemble the data module(s) 310 selected by the selector 315 to form a complete set of data to be used by the example linear programming engine 240 to determine the routing solution for routing the set of specified flows in the network 100. For example, the data assembler 325 may assemble the selected data module(s) 310 into a single script conforming to a programming language (e.g., AMPL) capable of being interpreted by the linear programming engine 240.

Returning to FIG. 2, the example network controller 105 illustrated therein further includes the example route configurer 245 to configure the set of nodes 110A-F of the network 100 with the set of routes corresponding to the routing solution determined by the linear programming engine 240 for routing the set of flows in the network 100. In some examples, the set of routes determined by the linear programming engine 240 as the routing solution includes one or more route(s) specified for respective ones of the flows to be routed in the network 100. For example, for a given flow to be routed in the network 100, the linear programming engine 240 may determine one or more paths for routing the flow from the originating node 110A-F to the destination node 110A-F of the flow. Each of the paths may be specified by a subset of the nodes 110A-F and a subset of links 115A-J that collectively form the respective route. Also, in some examples in which route splitting is permitted and multiple, concurrent paths are included in the routing solution for a given flow, the routing solution specifies the portion of the bandwidth of the flow to be allocated to each concurrent path.

In the illustrated example of FIG. 2, the route configurer 245 transmits routing information (e.g., via the network interface 205 and the links 140A-F) to the nodes 110A-F to cause routing tables maintained by respective ones of the nodes 110A-F to be updated to implement the set of routes specified by the routing solution determined by the linear programming engine 240. For example, for a given route specified in the routing solution for a given flow, the route configurer 245 transmits routing information to the subset of the nodes 110A-F included in the given route to cause their respective routing tables to be updated to implement the route.

As disclosed above, the routing solution determined by the linear programming engine 240 for routing the set of flows in the network 100 included a set of routes that are determined based on routing constraint information received by the routing request interface 225 and/or the configuration interface 210. In some examples, routing constraint information received by the routing request interface 225 and/or the configuration interface 210 includes at least two different sets of flow routing constraints that are to be satisfied (e.g., in combination) by the routing solution. In some examples, a first set of constraints included in the flow routing constraints specifies whether route splitting is permissible for respective ones of a set of flows to be routed in the network 100. In some examples, a second set of constraints included in the flow routing constraints specifies respective bandwidth demands for the respective ones of the set of flows to be routed in the network 100.

Figure 4:
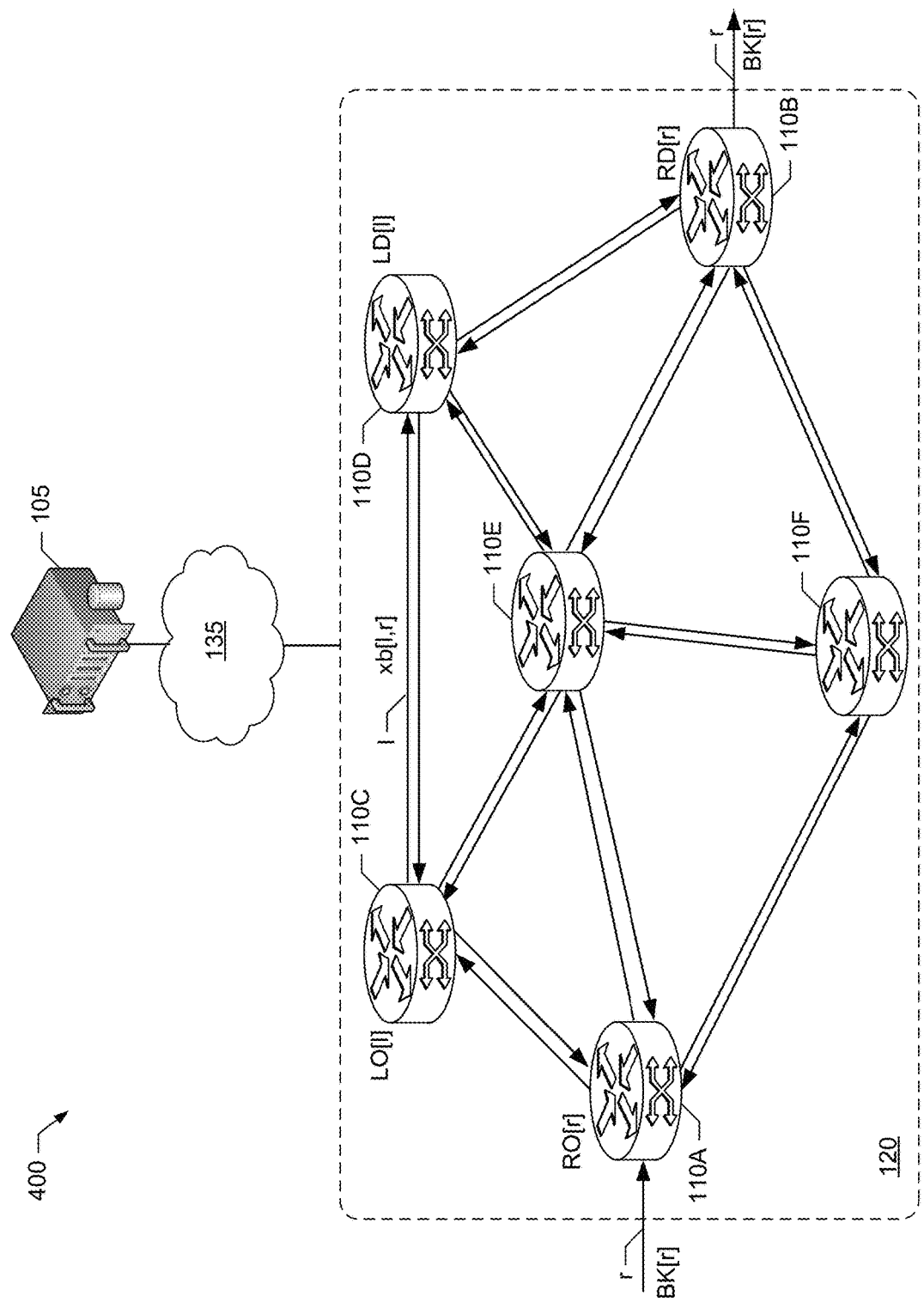
FIG. 4 illustrates example route splitting constraints that may be specified for flows in the example network of FIG. 1.

Example route splitting constraints 400 that may be specified for a set of flows to be routed in the core network 120 are illustrated in FIG. 4. In the illustrated example of FIG. 4, an example flow having an index of "r" is to be routed in the core network 120. The example route splitting constraints 400 of FIG. 4 include information specifying the respective origination and destination nodes 110A-F for the respective ones of the set of flows to be routed in the network. For example, for the flow r, the route splitting constraints 400 include information specifying the origination node 110A (labeled "ROM" in FIG. 4) and the destination node 110B (labeled "RD[r]" in FIG. 4) for the flow r. The example route splitting constraints 400 of FIG. 4 also includes a set of integers specifying largest numbers of concurrent paths over which the respective ones of the set of flows are permitted to be split when being routed in the core network 120. For example, the route splitting constraints 400 include an integer value (labeled "BK[r]" in FIG. 4) specifying a largest number of concurrent paths over which the flow r is permitted to be split when being routed in the core network 120.

As disclosed in further detail below, the constraint specifier 235 assembles a set of linear equalities and/or inequalities based on the set of route splitting constraints 400 that are solved by the linear programming engine 240 (possible in combination with other sets of constraints) to determine a set of routes satisfying the route splitting constraints 400 (and any other specified sets of constraints). In some examples, the linear programming engine 240 determines the set of routes by determining, for each flow to be routed in the network, which links in the core network 120 are to carry at least portions of the flow to meet the set of route splitting constraints 400. For example, for the flow r in the illustrated example of FIG. 4, the linear programming engine 240 solves a set of linear equalities and/or inequalities based on the set of route splitting constraints 400 to determine, for each link "l" identified by an origination node (labeled "LO[l]" in FIG. 4) and the destination node 110B (labeled "LD[l]" in FIG. 4), a value of a variable (labeled "xb[l,r]" in FIG. 4) which, if non-zero, indicates that a portion of the flow r is to be routed over that link l to meet the set of route splitting constraints 400. In such examples, the particular route determined by the linear programming engine 240 for the flow r includes the set of links having non-zero values of the variable xb[l,r], and the set of nodes terminating that set of links. An example set of linear equalities and/or inequalities based on the set of route splitting constraints 400 is disclosed in detail below.

Figure 5:
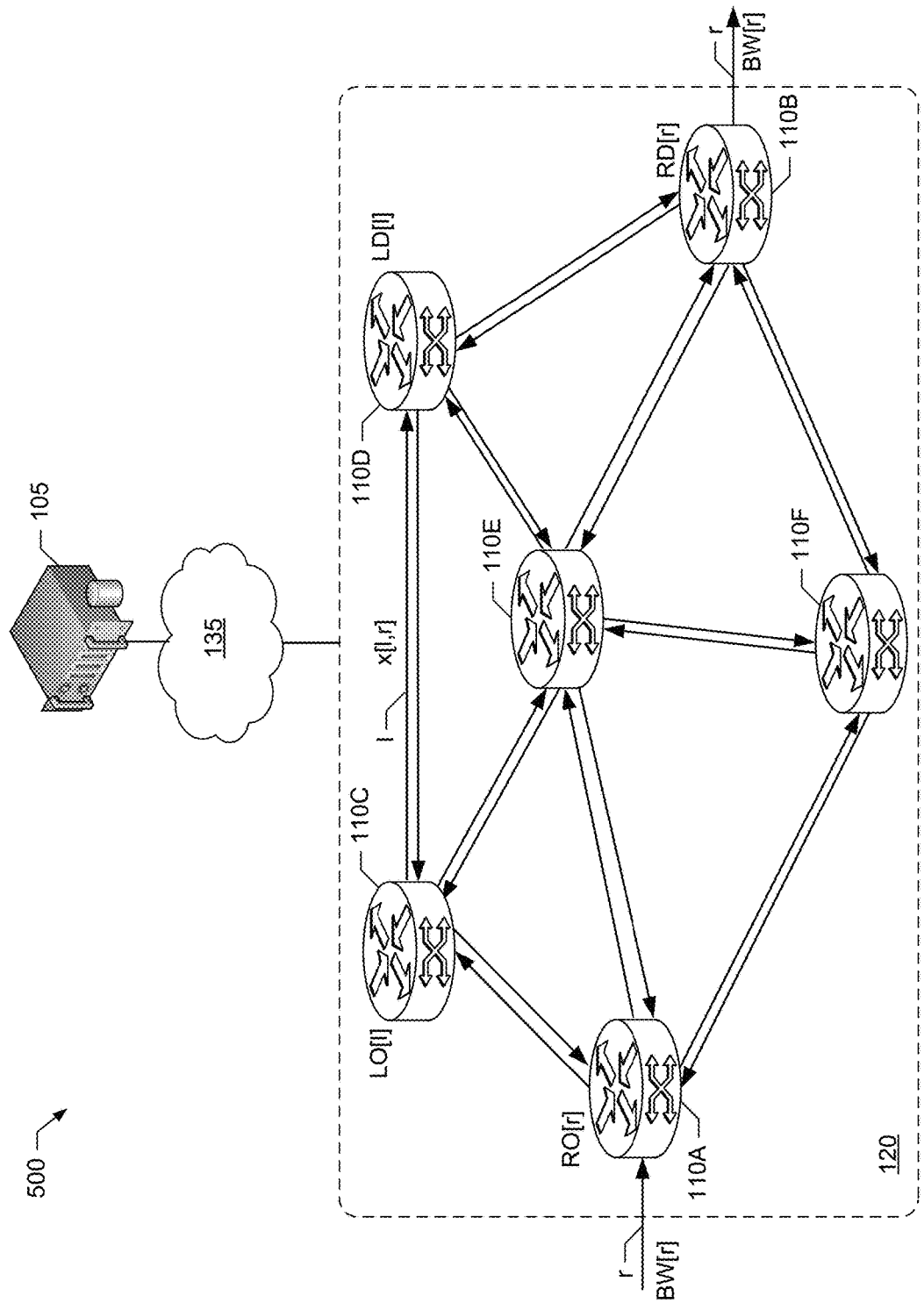
FIG. 5 illustrates example bandwidth demand constraints that may be specified for flows in the example network of FIG. 1.
Figure 7G:

Example bandwidth demand constraints 500 that may be specified for a set of flows to be routed in the core network 120 are illustrated in FIG. 5. In the illustrated example of FIG. 5, an example flow having an index of "r" is to be routed in the core network 120. The example bandwidth demand constraints 500 of FIG. 5 include information specifying the respective origination and destination nodes 110A-F for the respective ones of the set of flows to be routed in the network. For example, for the flow r, the bandwidth demand constraints 500 include information specifying the origination node 110A (labeled "RO[r]" in FIG. 5) and the destination node 110B (labeled "RD[r]" in FIG. 5) for the flow r. The example bandwidth demand constraints 500 of FIG. 5 also includes values representing the bandwidth demands (e.g., the bandwidth expected to be utilized) for the respective ones of the set of flows to be routed in the core network 120. For example, the bandwidth demand constraints 500 include a value (labeled "BW[r]" in FIG. 5) specifying the bandwidth demand for the flow, r, to be routed in the core network 120.

As disclosed in further detail below, the constraint specifier 235 assembles a set of linear equalities and/or inequalities based on the set of bandwidth demand constraints 500 that are solved by the linear programming engine 240 (possible in combination with other sets of constraints) to determine a set of routes satisfying the bandwidth demand constraints 500 (and any other specified sets of constraints). In some examples, the linear programming engine 240 determines the set of routes by determining, for each flow to be routed in the network, which links in the core network 120 are to carry at least portions of the flow's bandwidth to meet the set of bandwidth demand constraints 500. For example, for the flow r in the illustrated example of FIG. 5, the linear programming engine 240 solves a set of linear equalities and/or inequalities based on the set of bandwidth demand constraints 500 to determine, for each link "l" identified by an origination node (labeled "LO[l]" in FIG. 5) and the destination node 110B (labeled "LD[l]" in FIG. 5), a value of a variable (labeled "x[l,r]" in FIG. 5) which indicates the portion of the flow r's bandwidth that is to be routed over that link l to meet the set of bandwidth demand constraints 500. In such examples, the particular route determined by the linear programming engine 240 for the flow r includes the set of links having non-zero values of the variable x[l,r], and the set of nodes terminating that set of links. An example sets of linear equalities and/or inequalities based on the set of bandwidth demand constraints 500 is disclosed in detail below.

With reference to FIGS. 4 and 5, in some examples, the linear programming engine 240 determines the set of routes for routing the specified set of flows in the core network 120 to satisfy a combination of the set of route splitting constraints 400 and the set of bandwidth demand constraints 500. In some examples, the constraint specifier 235 configures additional set(s) of constraints selected from a group of different selectable sets of constraints, as disclosed above, and combines linear equalities and/or inequalities based on the additional set(s) of constraints with the sets of linear equalities and/or inequalities based on the set of route splitting constraints 400 and the set of bandwidth demand constraints 500. In such examples, the linear programming engine 240 determines the set of routes for routing the specified set of flows in the core network 120 to satisfy a combination of the set of route splitting constraints 400, the set of bandwidth demand constraints 500 and the additional set(s) of constraints selected and configured by the constraint specifier 235.

As described above, in some examples, the routing constraint information received by routing request interface 225 and/or the configuration interface 210 includes routing solution parameters specifying whether fair allocation of flows to routes is allowed if the linear programming engine 240 is unable to determine a routing solution (e.g., a set of routes) that satisfies the combination of sets of flow routing constraints assembled by the constraint specifier 235. In some such examples, the routing constraint information also includes a set of priorities specified for respective ones of the set of flows to be routed in the core network 120. For example, the set of priorities may include values indicating whether respective ones of the set of flows are to be treated as default flows (e.g., with a priority value of "0") or priority flows (e.g., with a priority value of "1").

In some examples supporting fair allocation, the linear programming engine 240 determines whether a combination of sets of constraints specified for the set of flows is able to be satisfied. When the combination of sets of constraints specified for the set of flows is not able to be satisfied, the linear programming engine 240 instead determines a routing solution (e.g., a set of routes) to meet a combination of a first subset of the set of route splitting constraints 400 and a first subset of the set of bandwidth demand constraints 500 (and subset(s) of any other set(s) of constraints) specified for a first subset of the set of flows having a first priority (e.g., corresponding to priority flows). However, the determined routing solution may not meet a combination of a second subset of the set of route splitting constraints 400 and a second subset of the set of bandwidth demand constraints 500 (and subset(s) of any other set(s) of constraints) specified for a second subset of the set of flows having a second priority different from the first priority (e.g., corresponding to default flows). In some such examples, the linear programming engine 240 performs a fair allocation of link bandwidth among the second subset of the set of flows (e.g., the default flows) after allocating the respective bandwidth demands for the first subset of the set of flows (e.g., the priority flows) to the set of links included in the routes determined for the first subset of the set of flows. Thus, in summary, when fair allocation is supported, the linear programming engine 240 determines the set of routes to include routes for the priority flows that satisfy the combination of the sets of specified constraints for the priority flows, and to include routes for the default flows that may not satisfy the combination of the sets of specified constraints for the default flows, but which at least provide some capacity for routing the default flows in the core network 120.

As described above, in some examples, the routing constraint information received by routing request interface 225 and/or the configuration interface 210 includes routing solution parameters specifying whether link augmentation recommendations are to be provided if the linear programming engine 240 is unable to determine a routing solution (e.g., a set of routes) that satisfies the combination of sets of flow routing constraints assembled by the constraint specifier 235. In some examples supporting link augmentation recommendations, the linear programming engine 240 determines whether a combination of sets of constraints specified for the set of flows is able to be satisfied. When the combination of sets of constraints specified for the set of flows is not able to be satisfied, the linear programming engine 240 determining a set of link augmentation recommendations for augmenting link capacity of one or more of the links 115A-J in the core network 120 to permit the combination of the sets of constraints specified for the set of flows to be satisfied by a set of routes. In some examples, link augmentation recommendations correspond to values indicating amounts of additional capacity that, if added to one or more of the links 115A-J, would permit determination of a set of routes capable of satisfying the combination of the sets of constraints specified for the set of flows to be routed in the core network 120. For example, the linear programming engine 240 may determine a first augmentation value specifying a first amount of additional capacity to be added to a first one of the links 115A-J, a second augmentation value specifying a second amount of additional capacity (which may be the same as or different from the first amount) to be added to a second one of the links 115A-J, etc., and report the augmentation values to an operations and management system, a computer terminal, etc. (e.g., via the network interface 205).

FIGS. 6A-G collectively illustrate a first example script S1 including elements corresponding to computer readable instructions that may be assembled or otherwise configured by the example constraint specifier 235 of FIGS. 2 and/or 3. The first example script S1 is based on the AMPL programming language and includes sets of linear equalities and/or inequalities corresponding to sets of constraints to be solved by the linear programming engine 240 to determine a routing solution (e.g., a set of routes) for routing a set of specified flows in the network 100 (e.g., in the core network 120 of the network 100).

Turning to FIG. 6A, the example script S1 includes example elements 600 through 602 specifying the set of nodes 110A-F included in the network 100 (e.g., in the core network 120 of the network 100). The script S1 includes example elements 603 through 608 specifying the set of links 115A-J included in the network 100 (e.g., in the core network 120 of the network 100). The script S1 also includes example elements 609 and 610 that provide performance parameters associated with the links 115A-J, such as the distances of the respective links 115A-J (element 609) and the available capacities of the respective links 115A-J (element 610). The example script S1 further includes example elements 611 and 612 specifying parameters to be included in a cost function to be evaluated by the linear programming engine 240 when determining a routing solution.

To specify the set of flows (referred to as routes in the example script S1) to be routed in the network 100, the example script S1 includes example elements 613 through 616, which specify the number of flows, as well as the origination and destination nodes for each one of the flows. The example script S1 also includes an example element 617 specifying a set of bandwidth demand constraints for the set of flows, and an example element 618 specifying a set of route splitting constraints for the set of flows. The example script S1 further includes an example element 619 specifying respective priorities assigned to the flows (e.g., for use when fair allocation is enabled, as described above).

Turning to FIG. 6B, the example script S1 includes an example element 620 specifying a set of maximum hop constraints for respective ones of the set of flows to be routed in the network 100. The maximum hop constraint for a given flow is the maximum number of hops a route for the flow is permitted to have. The example script S1 also includes an example element 621 specifying a set of maximum distance constraints for respective ones of the set of flows to be routed in the network 100. The maximum distance constraint for a given flow is the maximum distance a route for the flow is permitted to have.

The example script S1 includes example elements 622 through 625 specifying constraints and associated parameters for flows requiring diversity (e.g., that are not permitted to be routed over the same path). The example script S1 also includes example elements 626 through 632 specifying parameters for ones of the links 115A-J that are included in bundles and/or SRLGs. Details of these elements are provided in FIG. 6B.

Turning to FIG. 6C, the example script S1 specifies example variables that are to be solved (e.g., for which values are to be determined) by the example linear programming engine 240. For example, the script S1 includes the example element 633 specifying the set of variables $x[l,r]$ described above, which used to specify the amount of each flow's bandwidth to be assigned to respective ones of the links 115A-J in the network 100. The example element 634 specifies the set of variable xb[l,r] described above, which indicate whether a flow is to be routed over respective ones of the links 115A-J to meet the specified route splitting constraints. Example element 635 and 636 are used for fair allocation, and indicate how much of a flow's bandwidth is supported by a given route when fair allocation is employed. The example elements 637 through 639 are used for determining routes satisfying the specified diversity constraints (e.g., in combination with the other specified constraints). Example element 640 is used for determining link augmentation recommendations. Example element 641 is used for determining routes satisfying the specified bundling/SRLG constraints (e.g., in combination with the other specified constraints)

Turning to FIG. 6D, the example script S1 includes example elements 642 through 644 specifying example sets of linear equalities and/or inequalities based on the example route splitting constraints specified in element 618. For example, element 642 specifies a first set of linear equalities to ensure that the determined set of routes results in all of the routed paths for the respective ones of the set of flows, r, arrive at the appropriate destination nodes, RD[r], for the respective flows. The element 643 specifies a second set of linear equalities to ensure that the determined set of routes results in all of the routed paths for the respective ones of the set of flows, r, leave from the appropriate origination nodes, RO[r], for the respective flows. Element 644 specifies a third set of linear equalities to ensure that path conservation is observed at the intermediate nodes along a route for a flow, r, by ensuring the all of the paths for flow r arriving at a node that is not the flow's origination or destination node also leave the node.

The example script S1 includes example elements 645 through 649 specifying example sets of linear equalities and/or inequalities based on the example bandwidth demand constraints specified in element 617. For example, element 645 specifies a first set of linear equalities to ensure that the determined set of routes results in all of the routed bandwidth for the respective ones of the set of flows, r, arrives at the appropriate destination nodes, RD[r], for the respective flows. The element 646 specifies a second set of linear equalities to ensure that the determined set of routes results in all of the routed bandwidth for the respective ones of the set of flows, r, leaving from the appropriate origination nodes, RO[r], for the respective flows. Elements 647 and 648 specify relationships used to enforce fair bandwidth allocation according to the priorities specified for the respective flows. Element 649 specifies a third set of linear equalities to ensure that bandwidth conservation is observed at the intermediate nodes along a route for a flow, r, by ensuring that all of the bandwidth arriving at a node that is not the flow's origination or destination node also leaves the node.

Turning to FIG. 6E, the example script S1 includes an example element 650 specifying a set of linear inequalities to ensure that the determined set of routes satisfy the maximum hop constraints specified in element 620. The example script S1 also includes an example element 651 specifying a set of linear inequalities to ensure that the determined set of routes satisfy the maximum distance constraints specified in element 621. Example elements 652 and 653 of the example script S1 specify sets of linear equalities and/or inequalities to ensure that the determined set of routes are allocated such that the proper portion of each flow's bandwidth demand is assigned to respective one's of the links 115A-J to also meet the route splitting constraints.

The example script S1 further includes example elements 654 through 657 specifying sets of linear equalities and/or inequalities to ensure that the determined set of routes satisfies the capacity parameters associated with the links 115A-J in the network 100, which are represented by element 610. In the illustrated example, the script S1 supports two models for modeling capacity, namely, an L1 model corresponding to element 654, in which flow bandwidth is allocated to links bidirectionally, and an L3 model corresponding to elements 655 through 657, in which flow bandwidth is allocated to links unidirectionally. Additionally, in the illustrated example, the element 657 is used to specify whether link augmentation recommendations are to be provided. If link augmentation recommendations are not to be provided, element 657 is included in the script S1 and forces the link capacity augmentation recommendation, v[l], for each link, l, to be set to 0. However, if link augmentation recommendations are to be provided, the element 657 is omitted from the script S1 and the linear programming engine 240 solves for values of the link capacity augmentation variables, v[l], for the respective links, l, along with solving the other sets of linear equalities and/or inequalities to determine a routing solution satisfying the specified sets of constraints.

Turning to FIG. 6F, the example script S1 includes example element 658 specifying a set of linear inequalities to ensure that the determined set of routes satisfies the diversity constraints specified in elements 622 through 625. The example script S1 also includes example elements 659 through 661 specifying sets of linear inequalities to ensure that the determined set of routes satisfies the bundling/SRLG constraints specified in elements 626 through 632.

Turning to FIG. 6G, the example script S1 includes an example element 662 specifying an example cost function to be evaluated by the linear programming engine 240 when determining the routing solution (e.g., the set of routes) for routing the set of specified flows in the network 100. For example, to determine the routing solution, the linear programming engine 240 solves for a set or routes by solving for values of the variables specified in the elements 633 through 641 that satisfy the combination (e.g., all) of the different sets of linear equalities and/or inequalities and associated relationships and parameters specified in the elements 642 through 661, and also reduce (e.g., minimize) the cost function specified in the element 662.

In some examples, different groups of the elements 601 through 662 of the example script S1 are included in different constraint modules 305, which are selectively combined by the constraint specifier 235 to determine the script S1. For example, the elements 601 through 608, 613 through 619, 642 through 649, 652 and 653 could be included in a first one of the constraint modules 305 containing a default set of constraints. In some examples, the elements 620 and 650 could be included in a second one of the constraint modules 305 directed to maximum hop constraints for the set of flows. In some examples, the elements 609, 621 and 651 could be included in a third one of the constraint modules 305 directed to maximum distance constraints for the set of flows. In some examples, the elements 610 and 654-657 could be included in a fourth one of the constraint modules 305 directed to link capacity constraints. In some examples, the elements 622 through 625 and 658 could be included in a fifth one of the constraint modules 305 directed to link diversity constraints. In some examples, the elements 626 through 632 and 659 through 661 could be included in a sixth one of the constraint modules 305 directed to link bundling/SRLG constraints. In some examples, the elements 611, 612 and 662 could be included in a seventh one of the constraint modules 305 directed to a cost function to be reduced (e.g., minimized). In some such examples, the constraint specifier 235 is configured (e.g., via information received by the configuration interface 210 and/or the routing request interface 225 to select which one or more of the constraint modules 305 is/are to be included in the example script S1.

As disclosed above, in some examples, the network controller 105 supports bandwidth calendaring for flows scheduled to occur at specific times and for specific durations (which may or may not be overlapping). Referring to FIGS. 4 and 5, in some such examples, a set of route splitting constraints 400 and a first set of bandwidth demand constraints 500, the latter specifying respective first bandwidth demands expected at a future first time for the respective ones of a set of flows, are received by the routing request interface 225 and/or the configuration interface 210. In such examples, the linear programming engine 240 determines, prior to that first time, a first set of routes to route the set of flows in the core network 120 at the first time, which satisfy a combination of the route splitting constraints 400 and the first set of bandwidth demand constraints 500 (and any other set(s) of constraints) assembled by the constraint specifier 235. In such examples, the route configurer 245 transmits first routing information describing the first set of routes to the set of nodes 110A-F in the core network 120 prior to the first time to cause routing tables maintained by respective ones of the nodes 110A-F to be updated to implement the first set of routes at the first time.

Additionally, the flow routing constraints received by the routing request interface 225 and/or the configuration interface 210 include a second set of bandwidth demand constraints 500 specifying respective second bandwidth demands expected at a future second time later than the first time for the respective ones of the set of flows (or a set of different flows) to be routed in the core network 120. In such examples, the linear programming engine 240 determines, prior to that second time, and possibly prior to the first time, a second set of routes to route the set of flows in the core network 120 at the second time, which satisfy a combination of the route splitting constraints 400 and the second set of bandwidth demand constraints 500 (and any other set(s) of constraints) assembled by the constraint specifier 235. In such examples, the route configurer 245 transmits second routing information describing the second set of routes to the set of nodes 110A-F in the core network 120 prior to the second time to cause routing tables maintained by respective ones of the nodes 110A-F to be updated to implement the second set of routes at the second time.

With the foregoing in mind, FIGS. 7A-G collectively illustrate a second example script S2 including elements corresponding to computer readable instructions that may be assembled or otherwise configured by the example constraint specifier 235 of FIGS. 2 and/or 3 to support bandwidth calendaring. The second example script S2 is based on the AMPL programming language and includes sets of linear equalities and/or inequalities corresponding to sets of constraints to be solved by the linear programming engine 240 to determine a routing solution (e.g., a set of routes) for routing a set of specified flows in the network 100 (e.g., in the core network 120 of the network 100). The second example script S2 of FIGS. 7A-G includes several elements in common with the first example script S1 of FIGS. 6A-G. As such, like elements in FIGS. 6A-G and 7A-G are labeled with the same reference numerals. The detailed descriptions of these like elements are provided above in connection with the discussion of FIGS. 6A-G and, in the interest of brevity, are not repeated in the discussion of FIGS. 7A-G.

Turning to FIGS. 7A-G, the example script S2 includes example elements 701 through 703 (FIG. 7A) defining a time period, and example elements 704 through 706 (FIG. 7B) define an active time range for the routing solution to be determined by the linear programming engine 240 using the example script S2. In the example script S2, the example element 710 (FIG. 7A) corresponds to the element 610 in the example script S1, which specifies the available capacities of the links 115A-J. However, the element 710 is revised to permit the available capacities of the links 115A-J to be time dependent and, thus, to have values that change over the defined time period.

In the example script S2, the example elements 733, 734, 737 and 740 (FIG. 7C) correspond to the elements 633, 634, 637 and 640, respectively, of the example script S1. However, elements 733, 734, 737 and 740 are modified to permit the variables specified by these elements to be time dependent and, thus, to have values that change over the defined time period.

In the example script S2, the example elements 742 through 746 and 749 through 761 (FIGS. 7C-7F) correspond to the elements 642 through 646 and 649 through 661, respectively, of the example script S1. However, elements 742 through 746 and 749 through 761 are modified to permit the sets of linear equalities and/or inequalities specified by these elements to be time dependent and, thus, to result in a routing solution that is valid for the specified active time range. Furthermore, the example script S2 includes example elements 780 and 781 specifying example sets of linear equalities and/or inequalities to ensure the routing solutions remain valid to the specified active time range.

In the example script S2, the example element 762 (FIG. 7G) corresponds to the example element 662 of the example script S1. However, the element 762 is revised to permit the cost function to be time dependent and, thus, vary over the defined time period.

While an example manner of implementing the network controller 105 of FIG. 1 is illustrated in FIGS. 2-3, one or more of the elements, processes and/or devices illustrated in FIGS. 2-3 may be combined, divided, re-arranged, omitted, eliminated and/or implemented in any other way. Further, the example network interface 205, the example configuration interface 210, the example network architecture storage 215, the example network monitor 220, the example routing request interface 225, the example constraint storage 230, the example constraint specifier 235, the example linear programming engine 240, the example route configurer 245, the example constraint modules 305, the example data modules 310, the example selector 315, the example constraint assembler 320, the example data assembler 325 and/or, more generally, the example network controller 105 may be implemented by hardware, software, firmware and/or any combination of hardware, software and/or firmware. Thus, for example, any of the example network interface 205, the example configuration interface 210, the example network architecture storage 215, the example network monitor 220, the example routing request interface 225, the example constraint storage 230, the example constraint specifier 235, the example linear programming engine 240, the example route configurer 245, the example constraint modules 305, the example data modules 310, the example selector 315, the example constraint assembler 320, the example data assembler 325 and/or, more generally, the example network controller 105 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network controller 105, the example network interface 205, the example configuration interface 210, the example network architecture storage 215, the example network monitor 220, the example routing request interface 225, the example constraint storage 230, the example constraint specifier 235, the example linear programming engine 240, the example route configurer 245, the example constraint modules 305, the example data modules 310, the example selector 315, the example constraint assembler 320 and/or the example data assembler 325 is/are hereby expressly defined to include a tangible computer readable storage device or storage disk such as a memory, a digital versatile disk (DVD), a compact disk (CD), a Blu-ray disk, etc. storing the software and/or firmware. Further still, the example network controller 105 of FIG. 1 may include one or more elements, processes and/or devices in addition to, or instead of, those illustrated in FIGS. 2-3, and/or may include more than one of any or all of the illustrated elements, processes and devices.

Figure 8A:
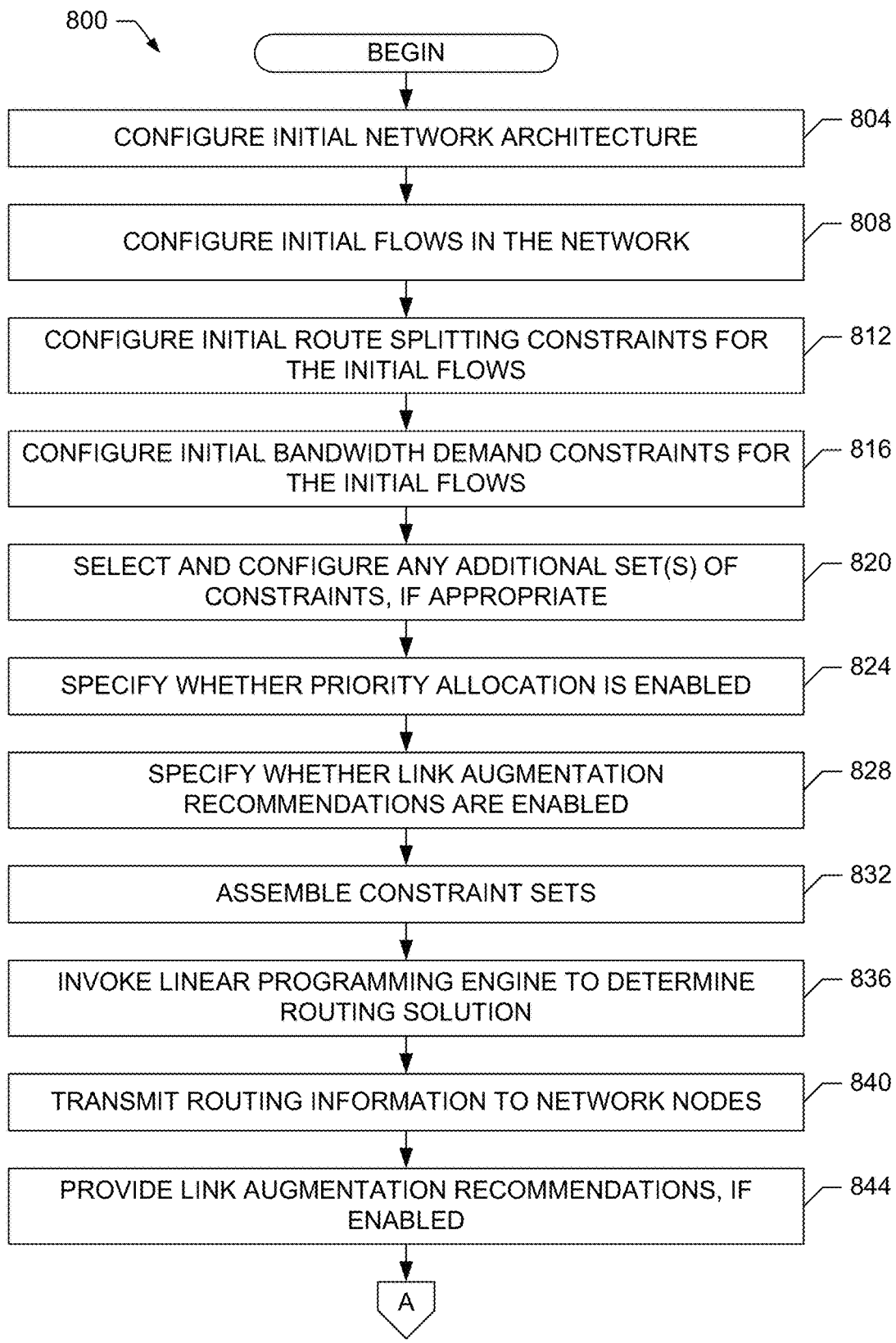
FIGS. 8A-8B collectively form a flowchart representative of example machine readable instructions that may be executed to implement the example network controllers of FIGS. 1 and/or 2.
Figure 8B:
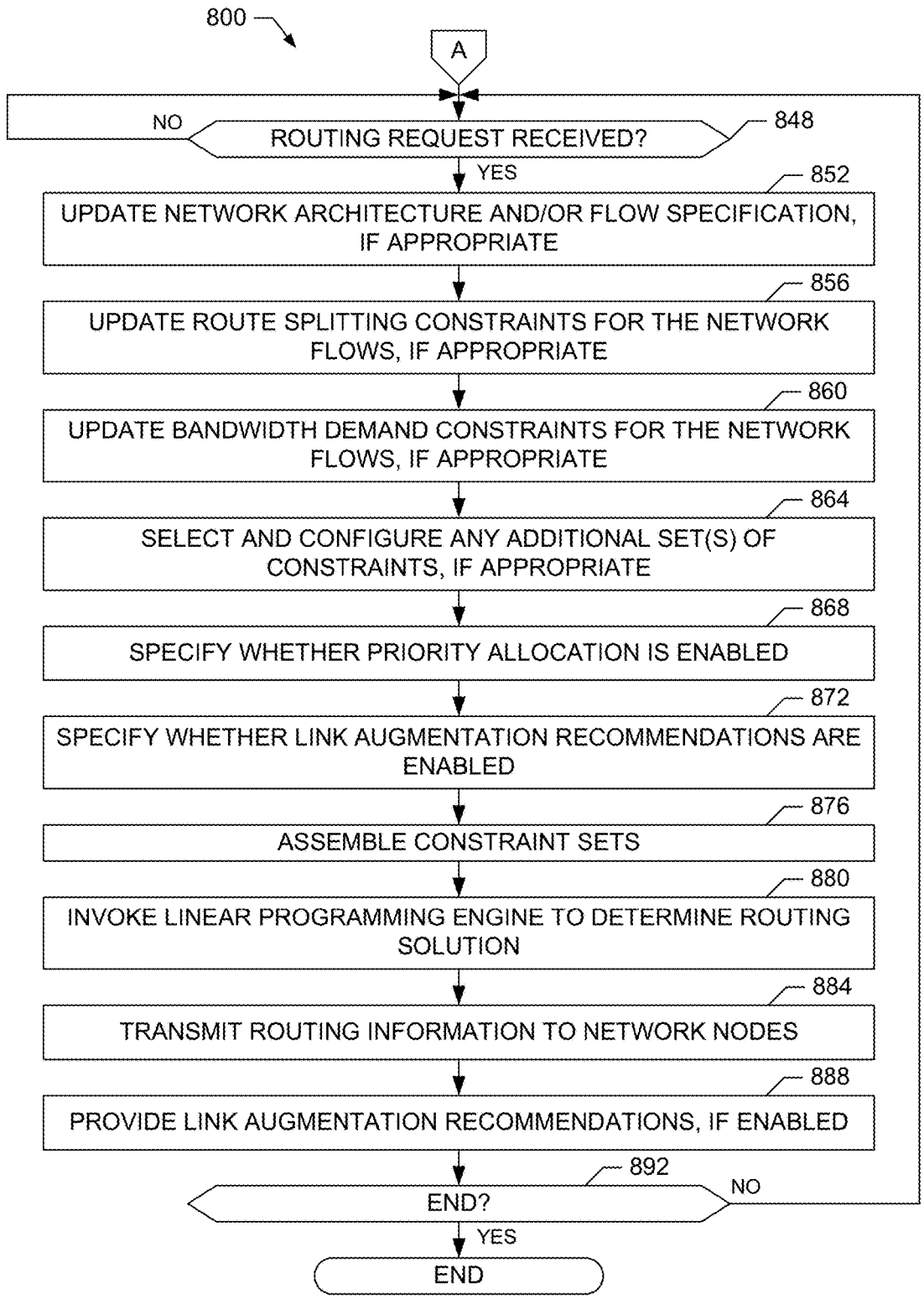

Flowcharts representative of example machine readable instructions for implementing the example network controller 105, the example network interface 205, the example configuration interface 210, the example network architecture storage 215, the example network monitor 220, the example routing request interface 225, the example constraint storage 230, the example constraint specifier 235, the example linear programming engine 240, the example route configurer 245, the example constraint modules 305, the example data modules 310, the example selector 315, the example constraint assembler 320 and/or the example data assembler 325 are shown in FIGS. 8A-8B. In these examples, the machine readable instructions comprise one or more programs for execution by a processor, such as the processor 912 shown in the example processor platform 900 discussed below in connection with FIG. 9. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 912, but the entire program or programs and/or portions thereof could alternatively be executed by a device other than the processor 912 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 8A-8B, many other methods of implementing the example network controller 105, the example network interface 205, the example configuration interface 210, the example network architecture storage 215, the example network monitor 220, the example routing request interface 225, the example constraint storage 230, the example constraint specifier 235, the example linear programming engine 240, the example route configurer 245, the example constraint modules 305, the example data modules 310, the example selector 315, the example constraint assembler 320 and/or the example data assembler 325 may alternatively be used. For example, with reference to the flowcharts illustrated in FIGS. 8A-8B, the order of execution of the blocks may be changed, and/or some of the blocks described may be changed, eliminated, combined and/or subdivided into multiple blocks.

As mentioned above, the example processes of FIGS. 8A-8B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). Similarly, the scripts S1 and S2 of FIGS. 6A-G and 7A-G may be implemented using coded instructions (e.g., computer and/or machine readable instructions) stored on a tangible computer readable storage medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8A-8B may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). Similarly, the scripts S1 and S2 of FIGS. 6A-G and 7A-G may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

An example program 800 that may be executed to implement the network controller 105 of FIGS. 1-3 is represented by the flowchart shown in FIGS. 8A-8B. With reference to the preceding figures and associated written descriptions, the example program 800 of FIGS. 8A-8B begins execution at block 805 of FIG. 8A at which the network controller 105 performs an initial routing procedure to determine a routing solution for an initial set of flows specified for routing in the network 100. For example, at block 805 the example configuration interface 210 of the network controller 105 receives network architecture information describing the nodes 110A-F and links 115A-J included in the network 100, as well as their interconnections and any other architecture information. At block 808, the configuration interface 210 receives endpoint information for an initial set of flows to be routed in the network 100. At block 812, the configuration interface 210 receives initial route splitting constraints for the initial set of flows. At block 816, the configuration interface 210 receives initial bandwidth demand constraints for the initial set of flows. At block 820, the configuration interface 210 receives information describing any additional constraints (e.g., maximum hop constraints, maximum distance constraints, etc.) to be specified for the initial set of flows. At block 824, the configuration interface 210 receives information specifying whether priority allocation is enabled and, if so, the priority designations for the respective ones of the initial set of flows. At block 828, the configuration interface 210 receives information specifying whether link augmentation recommendations are enabled.

At block 832, the example constraint specifier 235 of the network controller 105 assembles the information received at blocks 804 to 828 into sets of constraints to be solved (e.g., simultaneously) by the example linear programming engine 240 to determine a routing solution. In some examples, the constraint specifier 235 selects relevant ones of the constraint modules 305 and/or data modules 310 based on the information received at blocks 804 to 828, and assembles the selected constraint modules 305 and/or data modules 310 into, for example, the example script S1 for processing by the linear programming engine 240. At block 836, the linear programming engine 240 is invoked to determine an initial routing solution (e.g., an initial set of routes) for routing the initial set of flows in the network, and which satisfies the sets of constraints assembled at block 832. At block 840, the example route configurer 245 of the network controller 105 transmits routing information describing the set of routes determined at block 836 to the nodes 110A-F of the network 100. At block 844, the linear programming engine 240 provides any link augmentation recommendations, if enabled.

Turning to FIG. 8B, at block 848 the network controller 105 begins performing a routing update procedure to determine updated routing solution(s) in response to received routing request(s). For example, at block 848 the network controller 105 determines whether a routing request has been received by the example routing request interface 225 and/or the example configuration interface 210 of the network controller 105. Assuming a routing request has been received by the routing request interface 225 (block 848), at block 852 the routing request interface 225 stores any updated network architecture information and/or flow specification information (e.g., flow endpoint information) from the routing request in the example constraint storage 230. At block 856, the routing request interface 225 stores an updated route splitting constraints specified in the received routing request for the specified set of flows in the constraint storage 230. At block 860, the routing request interface 225 stores any updated bandwidth demand constraints specified in the received routing request for the specified set of flows in the constraint storage 230. At block 864, the routing request interface 225 stores any additional constraints (e.g., maximum hop constraints, maximum distance constraints, etc.) specified in the received routing request for the specified set of flows in the constraint storage 230. At block 868, the routing request interface 225 stores any information from the received routing request specifying whether priority allocation is enabled and, if so, the priority designations for the respective ones of the specified set of flows. At block 872, the routing request interface 225 stores any information from the received routing request specifying whether link augmentation recommendations are enabled. Note that, if the routing request was received by the configuration interface 210 instead of the routing request interface 225, the processing at blocks 852 through 872 may be performed by the configuration interface 210 instead of the routing request interface 225.

At block 876, the example constraint specifier 235 of the network controller 105 assembles updated sets of constraints using the updated information received at blocks 852 through 872. In some examples, the constraint specifier 235 selects relevant ones of the constraint modules 305 and/or data modules 310 based on the updated information received at blocks 852 through 872, and assembles the selected constraint modules 305 and/or data modules 310 into, for example, an updated version of the example script S1 for processing by the linear programming engine 240. At block 880, the example linear programming engine 240 of the network controller 105 is invoked to determine, as described above, an updated routing solution (e.g., an updated set of routes) for routing the specified set of flows in the network, and which satisfies the sets of constraints assembled at block 876. At block 884, the example route configurer 245 of the network controller 105 transmits updated routing information describing the set of routes determined at block 880 to the nodes 110A-F of the network 100. At block 888, the linear programming engine 240 provides any link augmentation recommendations, if enabled. At block 892, the network controller 105 continues performing the routing update procedure to process new received routing requests until being commanded or otherwise configured to end processing.

Figure 9:
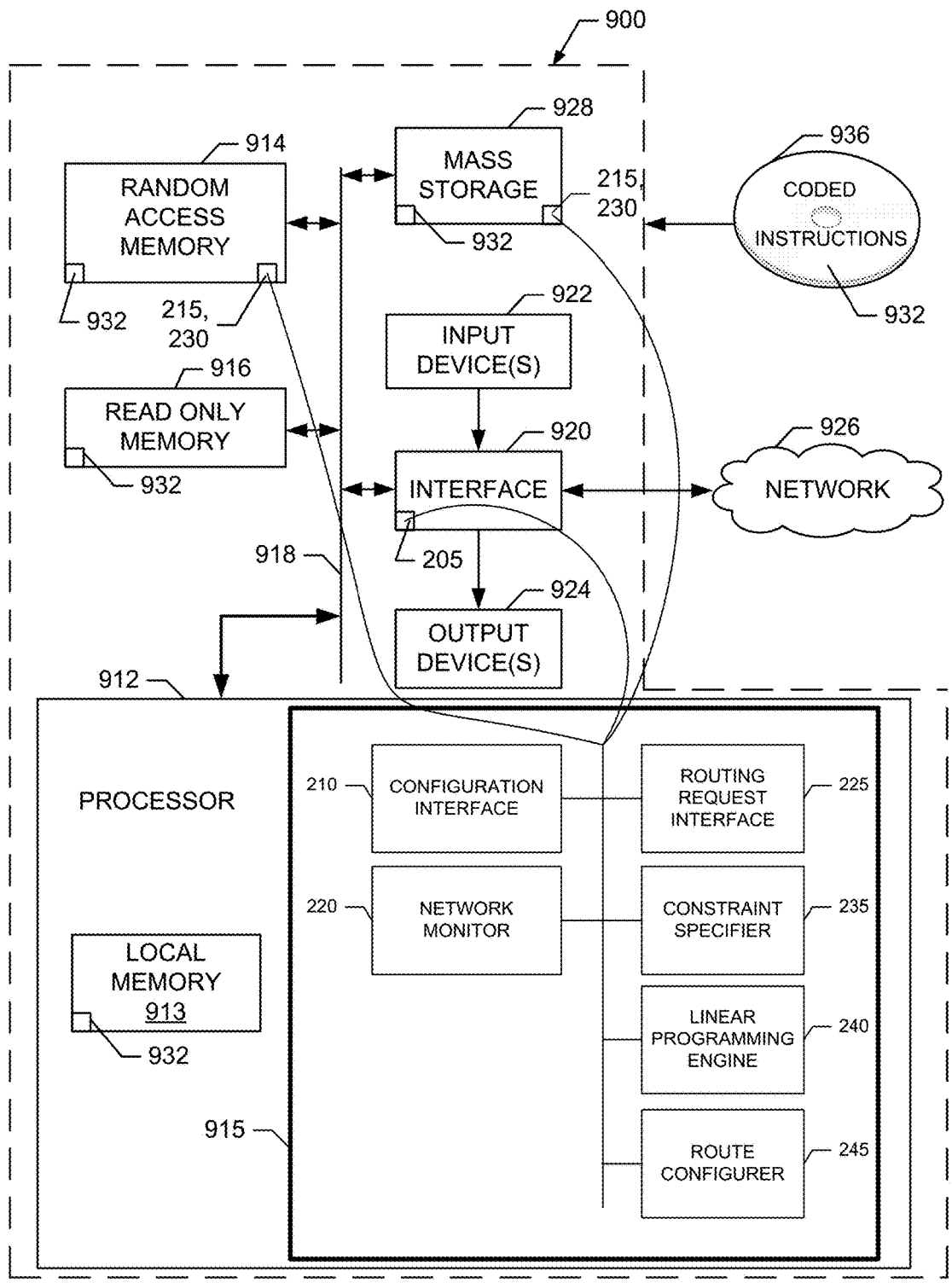
FIG. 9 is a block diagram of an example processor platform structured to execute the example machine readable instructions of FIGS. 8A-8B to implement the example network controllers of FIGS. 1 and/or 2.

FIG. 9 is a block diagram of an example processor platform 900 capable of executing the instructions of FIGS. 8A-8B to implement the example network controller 105, the example network interface 205, the example configuration interface 210, the example network architecture storage 215, the example network monitor 220, the example routing request interface 225, the example constraint storage 230, the example constraint specifier 235, the example linear programming engine 240, the example route configurer 245, the example constraint modules 305, the example data modules 310, the example selector 315, the example constraint assembler 320 and/or the example data assembler 325 of FIGS. 1-3. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. In the illustrated example of FIG. 9, the processor 912 includes one or more example processing cores 915 configured via example instructions 932, which include the example instructions of FIGS. 8A-8B, to implement the example network interface 205, the example configuration interface 210, the example network monitor 220, the example routing request interface 225, the example constraint specifier 235, the example linear programming engine 240 and the example route configurer 245 of FIG. 4.

The processor 912 of the illustrated example includes a local memory 913 (e.g., a cache). The processor 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 900, can allow the user to control the computer system and provide data to the computer using physical gestures, such as, but not limited to, hand or body movements, facial expressions, and face recognition One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.). In the illustrated example of FIG. 9, the interface circuit 920 is also structured to implement the example network interface 205.

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID (redundant array of independent disks) systems, and digital versatile disk (DVD) drives. In some examples, the mass storage device 930 may implement the example network architecture storage 215 and/or the example constraint storage 230. Additionally or alternatively, in some examples the volatile memory 918 may implement the example network architecture storage 215 and/or the example constraint storage 230.

Coded instructions 932 corresponding to the instructions of FIGS. 8A-8B may be stored in the mass storage device 928, in the volatile memory 914, in the non-volatile memory 916, in the local memory 913 and/or on a removable tangible computer readable storage medium, such as a CD or DVD 936.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method for route determination, the method comprising:

accessing, with a controller of a software defined network, a first set of constraints specifying whether route splitting is permissible for respective ones of a set of flows in the software defined network;

accessing, with the controller, a second set of constraints specifying respective bandwidth demands for the respective ones of the set of flows in the software defined network;

determining, with a linear programming model implemented by the controller, a set of routes based on the first and second sets of constraints, the set of routes to route the set of flows in the software defined network, the determining of the set of routes based on the first and second sets of constraints including:

determining whether a combination of the first and second sets of constraints specified for the set of flows is able to be satisfied in the software defined network; and when the combination of the first and second sets of constraints specified for the set of flows is not able to be satisfied, determining the set of routes to meet a combination of a first subset of the first set of constraints and a first subset of the second set of constraints specified for a first subset of the set of flows having a first priority, but to not meet a combination of a second subset of the first set of constraints and a second subset of the second set of constraints specified for a second subset of the set of flows having a second priority different from the first priority; and transmitting routing information from the controller to a set of nodes of the software defined network to cause routing tables maintained by respective ones of the set of nodes to be updated to implement the set of routes.

2. The method of claim 1, further including, when the combination of the first and second sets of constraints specified for the set of flows is not able to be satisfied by the set of routes, determining a set of link augmentation recommendations for augmenting link capacity in the software defined network to permit the combination of the first and second sets of constraints specified for the set of flows to be satisfied by the set of routes.

3. The method of claim 1, wherein the set of routes includes a set of nodes and a set of links, and further including:
allocating the respective bandwidth demands for the first subset of the set of flows to the set of links; and
performing a fair allocation of link bandwidth among the second subset of the set of flows.

4. The method of claim 1, wherein the first set of constraints includes a set of integers specifying numbers of concurrent paths over which respective ones of the set of flows are permitted to be routed, the second set of constraints includes a first bandwidth demand specified for a first one of the set of flows, and the set of routes includes a first route specified by a set of nodes and a set of links in the software defined network that are to route at least respective portions of the first bandwidth demand to meet a combination of the first and second sets of constraints.

5. The method of claim 1, further including:
configuring a third set of constraints selected from a group of different selectable sets of constraints; and
determining, with the linear programming model, the set of routes based on the first, second and third sets of constraints.

6. A method for route determination, the method comprising:
accessing, with a controller of a software defined network, a first set of constraints specifying whether route splitting is permissible for respective ones of a set of flows in the software defined network;
accessing, with the controller, a second set of constraints specifying respective bandwidth demands for the respective ones of the set of flows in the software defined network; and
determining, with a linear programming model implemented by the controller, a set of routes based on the first and second sets of constraints, the set of routes to route the set of flows in the software defined network, wherein the second set of constraints specifies respective first bandwidth demands expected at a future first time for the respective ones of the set of flows in the software defined network, the set of routes is a first set of routes to route the set of flows in the software defined network at the first time, the determining of the first set of routes is performed prior to the first time, and further including:
accessing, prior to the first time, a third set of constraints specifying respective second bandwidth demands expected at a future second time later than the first time for the respective ones of the set of flows in the software defined network;
determining, with the linear programming model and prior to the first time, a second set of routes based on the first and third sets of constraints, the second set of routes to route the set of flows in the software defined network at the second time;
transmitting first routing information to a first set of nodes of the software defined network prior to the first time to cause routing tables maintained by respective ones of the first set of nodes to be updated to implement the first set of routes at the first time; and
transmitting second routing information to a second set of nodes of the software defined network after the first time and prior to the second time to cause routing tables maintained by respective ones of the second set of nodes to be updated to implement the second set of routes at the second time.

7. A non-transitory computer readable medium comprising computer readable instructions which, when executed, cause a processor to perform operations comprising:
accessing a first set of constraints specifying whether route splitting is permissible for respective ones of a set of flows in a software defined network;
accessing a second set of constraints specifying respective bandwidth demands for the respective ones of the set of flows in the software defined network;
determining, with a linear programming model, a set of routes based on the first and second sets of constraints, the set of routes to route the set of flows in the software defined network, the determining of the set of routes based on the first and second sets of constraints including:
determining whether a combination of the first and second sets of constraints specified for the set of flows is able to be satisfied in the software defined network; and
when the combination of the first and second sets of constraints specified for the set of flows is not able to be satisfied, determining the set of routes to meet a combination of a first subset of the first set of constraints and a first subset of the second set of constraints specified for a first subset of the set of flows having a first priority, but to not meet a combination of a second subset of the first set of constraints and a second subset of the second set of constraints specified for a second subset of the set of flows having a second priority different from the first priority; and
transmitting routing information to a set of nodes implementing the software defined network to cause routing tables maintained by respective ones of the set of nodes to be updated to implement the set of routes.

8. The non-transitory computer readable medium of claim 7, wherein the operations further include, when the combination of the first and second sets of constraints specified for the set of flows is not able to be satisfied by the set of routes, determining a set of link augmentation recommendations for augmenting link capacity in the software defined network to permit the combination of the first and second sets of constraints specified for the set of flows to be satisfied by the set of routes.

9. The non-transitory computer readable medium of claim 7, wherein the set of routes includes the set of nodes and a set of links, and the operations further include:
   allocating the respective bandwidth demands for the first subset of the set of flows to the set of links; and
   performing a fair allocation of link bandwidth among the second subset of the set of flows.

10. The non-transitory computer readable medium of claim 7, wherein the first set of constraints includes a set of integers specifying numbers of concurrent paths over which respective ones of the set of flows are permitted to be routed, the second set of constraints includes a first bandwidth demand specified for a first one of the set of flows, and the set of routes includes a first route specified by a first subset of the set of nodes and a first subset of a set of links in the software defined network that are to route at least respective portions of the first bandwidth demand to meet a combination of the first and second sets of constraints.

11. The non-transitory computer readable medium of claim 7, wherein the operations further include:
   configuring a third set of constraints selected from a group of different selectable sets of constraints; and
   determining, with the linear programming model, the set of routes based on the first, second and third sets of constraints.

12. An apparatus to perform route determination, the apparatus comprising:
   memory including machine readable instructions; and
   a processor to execute the instructions to perform operations including:
      accessing a first set of constraints specifying whether route splitting is permissible for respective ones of a set of flows in a software defined network;
      accessing a second set of constraints specifying respective bandwidth demands for the respective ones of the set of flows in the software defined network;
      determining, with a linear programming model, a set of routes based on the first and second sets of constraints, the set of routes to route the set of flows in the software defined network, the determining of the set of routes based on the first and second sets of constraints including:
         determining whether a combination of the first and second sets of constraints specified for the set of flows is able to be satisfied in the software defined network; and
         when the combination of the first and second sets of constraints specified for the set of flows is not able to be satisfied, determining the set of routes to meet a combination of a first subset of the first set of constraints and a first subset of the second set of constraints specified for a first subset of the set of flows having a first priority, but to not meet a combination of a second subset of the first set of constraints and a second subset of the second set of constraints specified for a second subset of the set of flows having a second priority different from the first priority; and
      transmitting routing information to a set of nodes implementing the software defined network to cause routing tables maintained by respective ones of the set of nodes to be updated to implement the set of routes.

13. The apparatus of claim 12, wherein the operations further include, when the combination of the first and second sets of constraints specified for the set of flows is not able to be satisfied by the set of routes, determining a set of link augmentation recommendations for augmenting link capacity in the software defined network to permit the combination of the first and second sets of constraints specified for the set of flows to be satisfied by the set of routes.

14. The apparatus of claim 12, wherein the set of routes includes the set of nodes and a set of links, and the operations further include:
   allocating the respective bandwidth demands for the first subset of the set of flows to the set of links; and
   performing a fair allocation of link bandwidth among the second subset of the set of flows after allocating the respective bandwidth demands for the first subset of the set of flows to the set of links.

15. The apparatus of claim 12, wherein the first set of constraints includes a set of integers specifying numbers of concurrent paths over which respective ones of the set of flows are permitted to be routed, the second set of constraints includes a first bandwidth demand specified for a first one of the set of flows, and the set of routes includes a first route specified by a first subset of the set of nodes and a first subset of a set of links in the software defined network that are to route at least respective portions of the first bandwidth demand to meet a combination of the first and second sets of constraints.

16. The apparatus of claim 12, wherein the operations further include:
   configuring a third set of constraints selected from a group of different selectable sets of constraints; and
   determining, with the linear programming model, the set of routes based on the first, second and third sets of constraints.

* * * * *